(12) United States Patent
Hwang et al.

(10) Patent No.: US 8,470,955 B2
(45) Date of Patent: Jun. 25, 2013

(54) POLY(ARYLENE ETHER) COPOLYMER HAVING CATION-EXCHANGE GROUP, PROCESS OF MANUFACTURING THE SAME, AND USE THEREOF

(75) Inventors: Inchul Hwang, Gyeonggi-do (KR); Nak Hyun Kwon, Seoul (KR); Young Taek Kim, Seoul (KR); Dong Il Kim, Incheon (KR); Ju Ho Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/307,832

(22) Filed: Nov. 30, 2011

(65) Prior Publication Data

US 2012/0142790 A1 Jun. 7, 2012

(30) Foreign Application Priority Data

Dec. 2, 2010 (KR) .......................... 10-2010-0122249

(51) Int. Cl.
*C08G 8/02* (2006.01)

(52) U.S. Cl.
USPC ........... 528/125; 528/391; 528/373; 525/344; 525/353; 525/906; 429/479; 429/480; 429/498; 429/493

(58) Field of Classification Search
USPC .................. 528/125, 391, 373; 525/344, 353, 525/906; 429/479, 480, 498, 493
See application file for complete search history.

(56) References Cited

U.S. PATENT DOCUMENTS

| | | | |
|---|---|---|---|
| 5,010,197 A * | 4/1991 | Hergenrother et al. | 544/353 |
| 7,230,069 B2 | 6/2007 | Nobuta et al. | |
| 2011/0033776 A1 * | 2/2011 | Fuchs et al. | 429/492 |

FOREIGN PATENT DOCUMENTS

JP 2005-209576 A 8/2005

OTHER PUBLICATIONS

Connell et al. (Polymer, 1992, 33, 17, 3789-3743).*

* cited by examiner

*Primary Examiner* — Shane Fang
(74) *Attorney, Agent, or Firm* — Edwards Wildman Palmer LLP; Peter F. Corless

(57) ABSTRACT

The present invention relates to a poly(arylene ether) copolymer having a cation exchange group, a method for manufacturing the same, and use thereof. The poly(arylene ether) copolymer having the cation exchange group according to the present invention has excellent physical characteristics, ion exchanging capacity, metal ion adsorption capacity and a processability, and thus can be molded in various shapes and can be extensively applied to various fields such as recovering of organic metal, air purification, catalysts, water treatment, medical fields and separating of proteins.

17 Claims, 1 Drawing Sheet

POLY(ARYLENE ETHER) COPOLYMER HAVING CATION-EXCHANGE GROUP, PROCESS OF MANUFACTURING THE SAME, AND USE THEREOF

CROSS-REFERENCE TO RELATED APPLICATION

This application claims priority to and the benefit of Korean Patent Application No. 10-2010-0122249 filed on Dec. 2, 2010, the entire contents of which are incorporated herein by reference.

BACKGROUND OF THE INVENTION (a) Field of the Invention

The present invention relates to a poly(arylene ether) copolymer having a cation-exchange group, a method of manufacturing the same, and methods of use thereof.

(b) Description of the Related Art

An ion exchange resin generally comprises an ion exchange functional group on a polymer. It may have fine pores under moisture condition, and ion exchange occurs when ions are diffused in the space of the fine pores. Ion exchange resins are broadly classified into a cation exchange resin, an anion exchange resin, and a mixed resin and the like, depending on the type of ion exchange functional group to be introduced. Such ion exchange resins have been used for various purposes such as recovering of organic metal, air purification, catalysts, water treatment, medical fields and separation of proteins.

One example of a commercially available cation exchange resin is a styrene-based resin wherein an ion exchange group is introduced in the resin having a three dimensional network structure manufactured using divinylbenzene as a crosslinking agent on styrene. Although such a resin is generally chemically stable to strong acids and bases and allows ion exchange in the entire pH range, it may decompose, resulting in reduced exchange capacity, density, and moisture adsorption capacity if heated to temperatures of 150° C. or more. Further, if the resin is heated at 186° C. for 24 hours, it may not be used because the exchange capacity may be reduced by 15 to 40%.

In addition, most currently available ion exchange resins have limited ion exchange capacity, and processability is reduced because most resins are crosslinked. Thus, there is a need for a novel ion exchange resin that addresses these disadvantages.

SUMMARY OF THE INVENTION

In one aspect, the invention provides a poly(arylene ether) copolymer having excellent mechanical properties and cation exchange capacity.

In another aspect, the invention provides a method of manufacturing the copolymer of the invention.

In another aspect, the invention provides a cation exchange resin and a cation exchange membrane comprising the copolymer of the invention.

In one aspect, the invention provides a poly(arylene ether) copolymer represented by Formula 1:

[Formula 1]

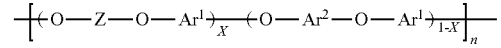

wherein,
each X is independently 0.01 to 0.99;
n is an integer of from 10 to 800;
each Z is independently represented by Formula 2-a;

[Formula 2-a]

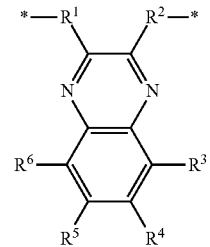

wherein,
each $R^1$ and $R^2$ are independently a chemical bond, an alkylene group, or arylene group, each of which is unsubstituted or substituted with a sulfonic acid group ($-SO_3^-M^+$), a phosphoric acid group ($-PO_3^-M^+$) or a carboxyl group ($-COO^-M^+$), wherein each $M^+$ is independently a cation; and each $R^3$ to $R^6$ are independently a hydrogen atom, a $C_{1-3}$ alkyl group, an alkylene group, or arylene group, each of which is unsubstituted or substituted with a sulfonic acid group ($-SO_3^-M^+$), a phosphoric acid group ($-PO_3^-M^+$) or a carboxyl group ($-COO^-M^+$), wherein each $M^+$ is independently a cation);

each $Ar^1$ is independently selected from the group consisting of Formula 3-a; and

[Formula 3-a]

and each $Ar^2$ is independently selected from the group consisting of Formula 4-a;

[Formula 4-a]

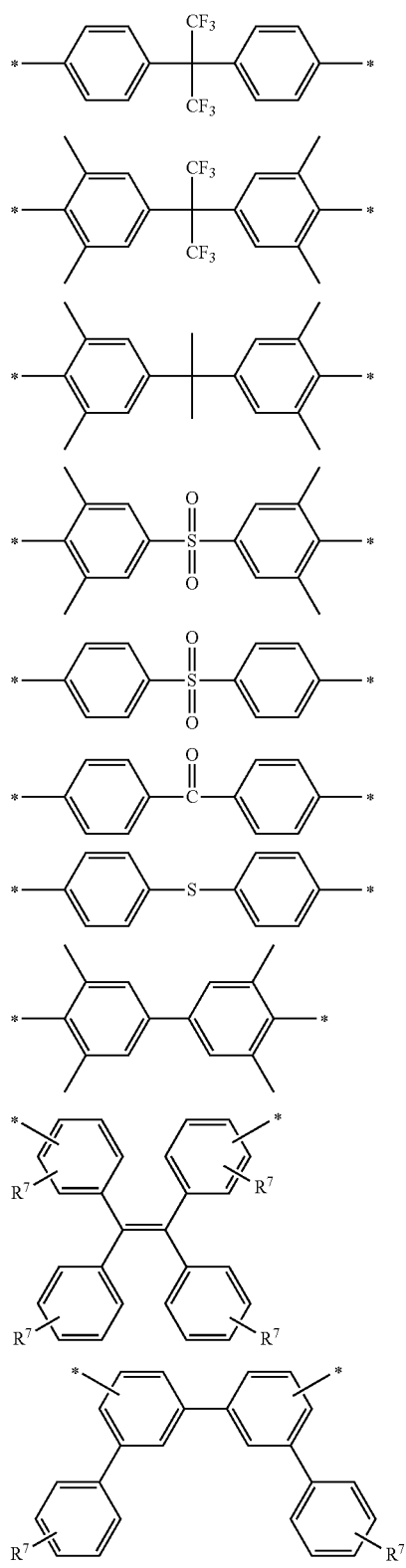

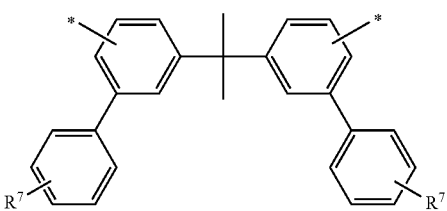

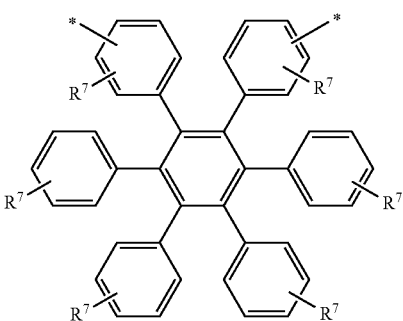

wherein, each $R^7$ is independently a hydrogen atom, a sulfonic acid group ($—SO_3^-M^+$), a phosphoric acid group ($—PO_3^-M^+$) or a carboxylic acid group ($—COO^-M^+$), wherein each $M^+$ is independently a cation;

provided that at least one of $R^1$ to $R^6$ is substituted with a sulfonic acid group ($—SO_3^-M^+$), a phosphoric acid group ($—PO_3^-M^+$) or a carboxylic acid group ($—COO^-M^+$) when $Ar^2$ does not have a sulfonic acid group ($—SO_3^-M^+$), a phosphoric acid group ($—PO_3^-M^+$) or a carboxylic acid group ($—COO^-M^+$)).

In one embodiment, each Z is independently selected from the group consisting of Formula 2-b:

[Formula 2-b]

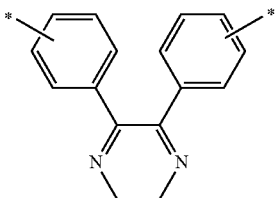

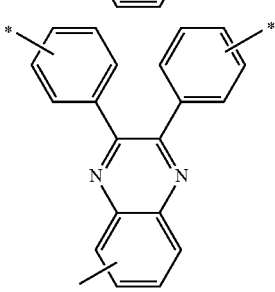

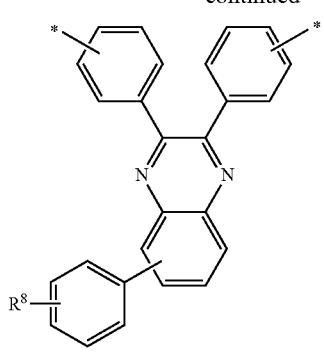

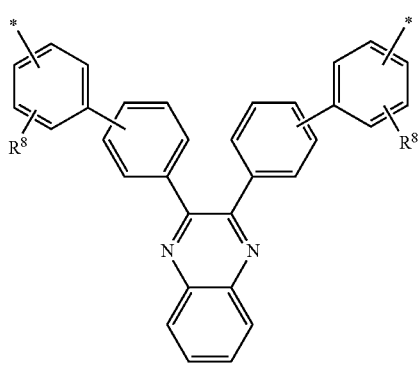

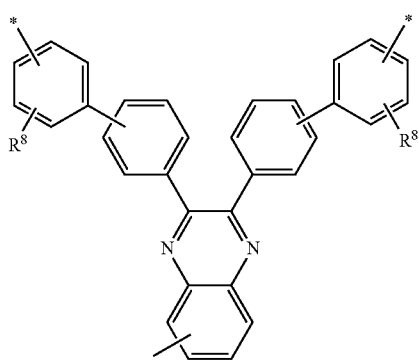

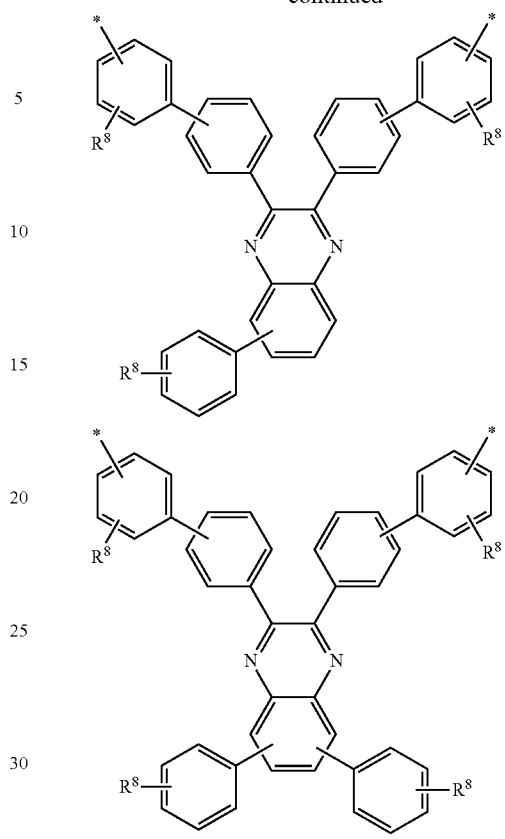

wherein,
each $R^8$ is independently a hydrogen atom, a sulfonic acid group ($-SO_3^-M^+$), a phosphoric acid group ($-PO_3^-M^+$) or a carboxylic acid group ($-COO^-M^+$), wherein each $M^+$ is independently a cation.

In certain embodiments, each cation ($M^+$) of the sulfonic acid group ($-SO_3^-M^+$), phosphoric acid group ($-PO_3^-M^+$) or carboxylic acid group ($-COO^-M^+$) is independently selected from the group consisting of a hydrogen ion, a potassium ion, a sodium ion, and a lithium ion, or a combination thereof.

In another embodiment, the copolymer may be a random copolymer or a block copolymer.

In certain embodiments, X is 0.1 to 0.9. In a further embodiment, X is 0.2 to 0.8. In other embodiments, X is 0.1 to 0.5. In other embodiments, X is 0.5 to 0.9.

In various embodiments, the copolymer has a weight average molecular weight of 10,000 to 1,000,000. In a further embodiment, the copolymer has a weight average molecular weight of 30,000 to 800,000. In another embodiment, the weight average molecular weight ranges from about 10,000 to about 500,000. In another embodiment, the weight average molecular weight ranges from about 25,000 to about 500,000. In another embodiment, the weight average molecular weight ranges from about 100,000 to about 500,000. In another embodiment, the weight average molecular weight ranges from about 100,000 to about 1,000,000. In another embodiment, the weight average molecular weight ranges from about 250,000 to about 1,000,000. In another embodiment, the weight average molecular weight ranges from about 250,000 to about 500,000.

In another aspect, the invention provides a method for manufacturing the poly(arylene ether) copolymer, as described above, comprising:

(a) copolymerizing a quinoxaline compound represented by Formula 2-c, with at least one compound of Formula 3-b, and at least one compound of Formula 4-b; and (b) introducing a cation exchange group selected from a sulfonic acid group (—SO$_3^-$M$^+$), a phosphoric acid group (—PO$_3^-$M$^+$) or a carboxylic acid group (—COO$^-$M$^+$) into the copolymerized polymer of step (a):

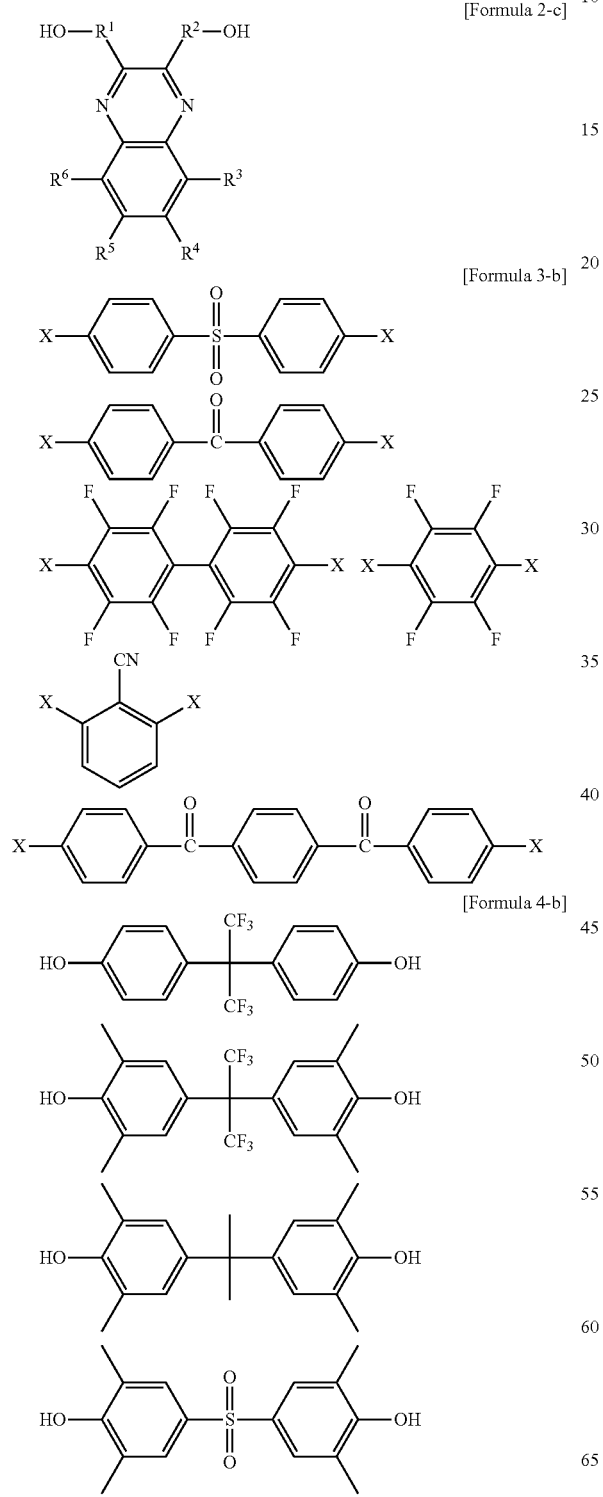

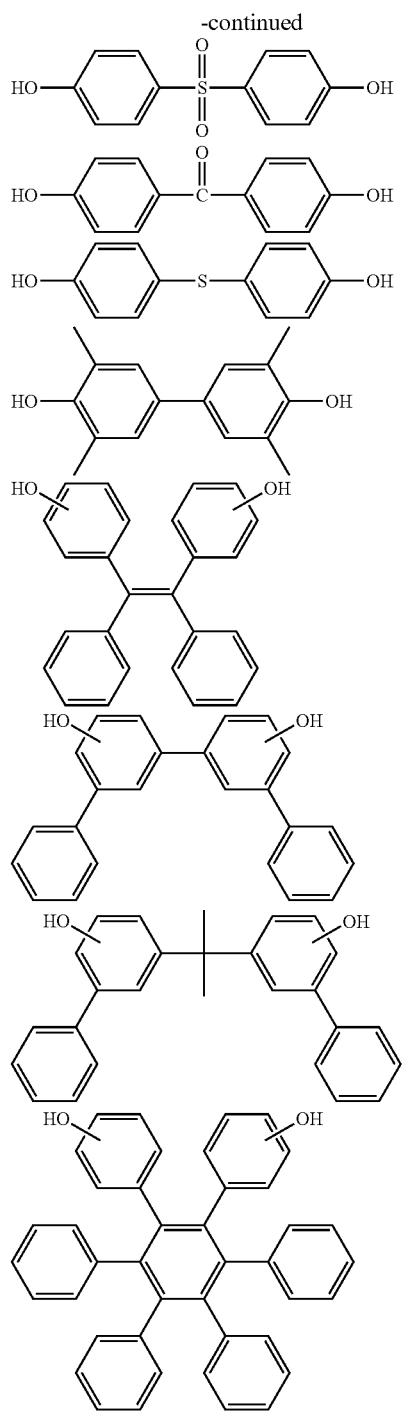

wherein, each R$^1$ and R$^2$ are independently a chemical bond, an alkylene group, or arylene group, each of which is unsubstituted or substituted with a sulfonic acid group (—SO$_3^-$M$^+$), a phosphoric acid group (—PO$_3^-$M$^+$) or a carboxyl group (—COO$^-$M$^+$), wherein each M$^+$ is independently a cation; and each R$^3$ to R$^6$ are independently a hydrogen atom, a C$_{1-3}$ alkyl group, an alkylene group, or arylene group, each of which is unsubstituted or substituted with a sulfonic acid group (—SO$_3^-$M$^+$), a phosphoric acid group (—PO$_3^-$M$^+$) or a carboxyl group (—COO⁻M⁺), wherein each M⁺ is independently a cation); and each X is independently a halogen atom.

In certain embodiments, the invention provides a method as described above, wherein the compound of Formula 2-c is independently selected from the group consisting of Formula 2-d:

[Formula 2-d]

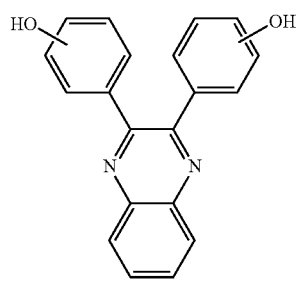

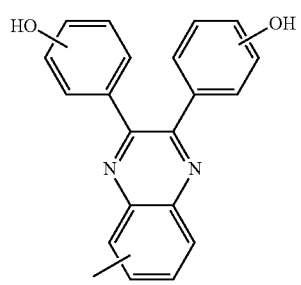

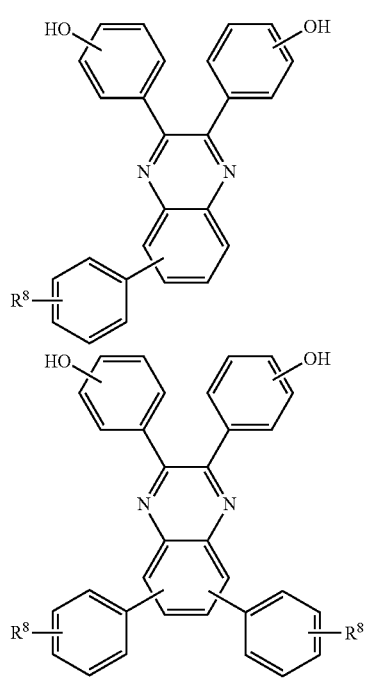

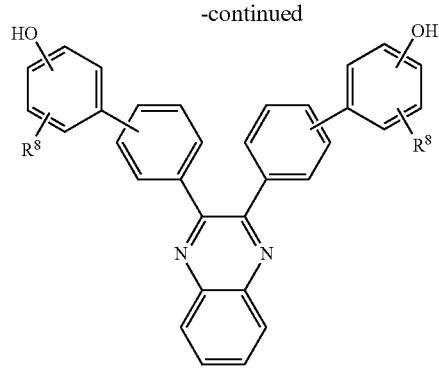

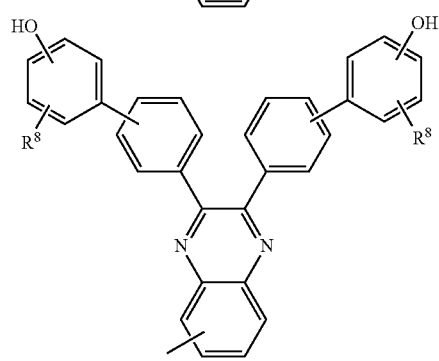

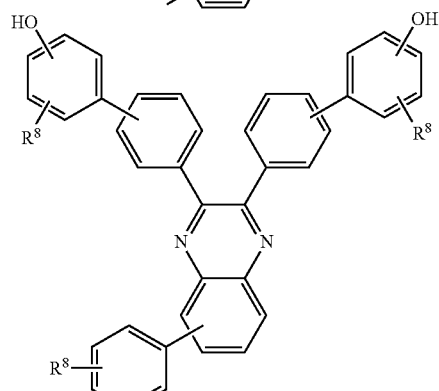

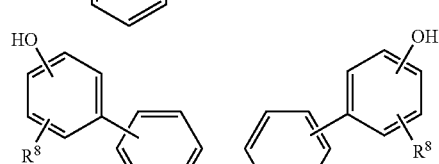

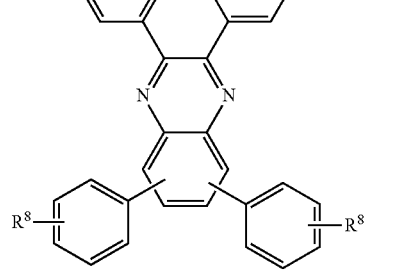

wherein,
each $R^8$ is independently a hydrogen atom, a sulfonic acid group (—SO$_3^-$M⁺), a phosphoric acid group (—PO$_3^-$M⁺) or a carboxylic acid group (—COO⁻M⁺), wherein M⁺ is a cation.

In various embodiments, the invention provides a method wherein in step (a) the copolymerizing of the compounds may be conducted so that an to equivalent ratio of at least one compounds selected from the group consisting of the Chemical Formula 3-b: the compound of the Chemical Formula 2-c: and at least one compound selected from the group consisting of the Chemical Formula 4-b is 1:0.05~0.95:0.05~0.95.

In various embodiments, the invention provides a method wherein in step (a), a ratio of compounds of Formula 3-b to Formula 2-c to Formula 4-b, is 1:0.05~0.95:0.05~0.95.

In various embodiments, the invention provides a method wherein in step (a) the copolymerizing of the compounds may be conducted so that the equivalent ratio of at least one compounds selected from the group consisting of the Chemical Formula 3-b: the compound of the Chemical Formula 2-c: and at least one compound selected from the group consisting of the Chemical Formula 4-b is 1:0.2~0.8:0.2~0.8.

In various embodiments, the invention provides a method wherein in step (a), a ratio of compounds of Formula 3-b to Formula 2-c to Formula 4-b, is 1:0.2~0.8:0.2~0.8.

In other embodiments, the invention provides a method as described above, wherein in step (a), the copolymerizing of the compounds is conducted in the presence of a solvent selected from the group consisting of dimethylacetamide, N-methylpyrrolidone, dimethylformamide, dimethyl sulfoxide, methylene chloride, chloroform, tetrahydrofuran, benzene, toluene, and xylene, or a combination thereof.

In certain embodiments, the invention provides a method wherein in step (b), the introducing of the cation exchange group into the copolymerized polymer is conducted using a sulfonic acid compound selected from concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP), or a combination thereof.

In another embodiment, the invention provides a method wherein in step (b), the introducing of the cation exchange group into the copolymerized polymer is conducted at a temperature ranging from about 0 to 100° C. In certain embodiments, the temperature ranges from about 0 to 50° C. In certain embodiments, the temperature ranges from about 25 to 75° C. In certain embodiments, the temperature ranges from about 50 to 100° C. In certain embodiments, the temperature ranges from about 0 to 25° C. In certain embodiments, the temperature ranges from about 25 to 50° C. In certain embodiments, the temperature ranges from about 50 to 75° C. In certain embodiments, the temperature ranges from about 75 to 100° C.

In another aspect, the invention provides a cation exchange resin comprising the poly(arylene ether) copolymer described herein.

In another aspect, the invention provides a cation exchange membrane comprising the poly(arylene ether) copolymer described herein.

In one embodiment, the cation exchange membrane further comprises a polymer selected from polyimide, polyetherketone, polysulfone, polyethersulfone, polyetherethersulfone, polybenzimidazole, polyphenylene oxide, polyphenylenesulfide, polystyrene, polytrifluorostyrene sulfonic acid, polystyrene sulfonic acid, polyvinylidenefluoride, polyurethane, and branched sulfonated polysulfoneketone copolymer, or a combination thereof.

In another embodiment, the cation exchange membrane further comprises an inorganic material selected from silicon oxide ($SiO_2$), titanium oxide ($TiO_2$), inorganic phosphoric acid, sulfonated silicon oxide (sulfonated $SiO_2$), sulfonated zirconium oxide (sulfonated ZrO), and sulfonated zirconium phosphate (sulfonated ZrP), or a combination thereof.

In another aspect, the cation exchange membrane is used for water treatment.

The poly(arylene ether) copolymer having cation exchange group according to the present invention has excellent physical characteristics, ion exchanging capacity, metal ion adsorption capacity and a processability, and thus can be molded in various shapes and can be extensively applied to various fields such as recovering of organic metal, air purification, catalysts, water treatment, medical fields and separating of proteins.

DETAILED DESCRIPTION OF THE EMBODIMENTS

Definitions

Figure 1:
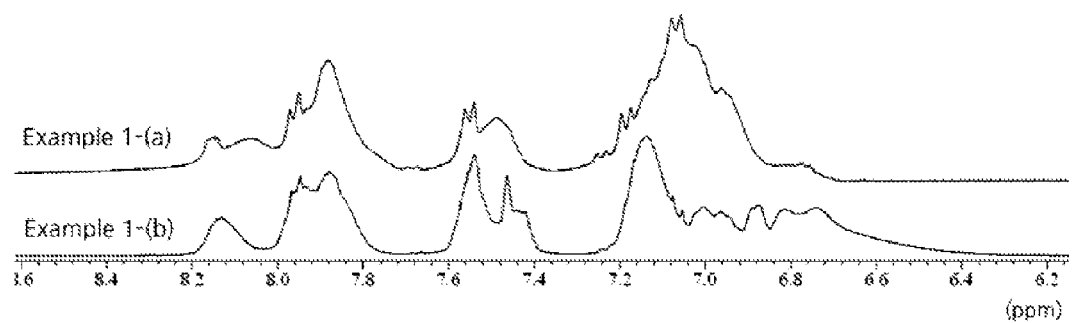
FIG. 1 is a graph showing nuclear magnetic resonance (NMR) spectrums of the poly(arylene ether) copolymer and poly(arylene ether) copolymer having cation exchange group according to one embodiment of the invention.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

As used herein, the term "halo" or "halogen" refers to any radical of fluorine, chlorine, bromine or iodine.

The terms "alkyl" refer to straight or branched chain hydrocarbon groups having 1 to 12 carbon atoms, preferably 1 to 8 carbon atoms. The expression "lower alkyl" refers to alkyl groups of 1 to 4 carbon atoms (inclusive).

The term "arylalkyl" refers to a moiety in which an alkyl hydrogen atom is replaced by an aryl group.

The term "alkenyl" refers to straight or branched chain hydrocarbon groups of 2 to 10, preferably 2 to 4, carbon atoms having at least one double bond. Where an alkenyl group is bonded to a nitrogen atom, it is preferred that such group not be bonded directly through a carbon bearing a double bond.

The term "alkoxy" refers to an —O-alkyl radical. The term "alkylenedioxo" refers to a divalent species of the structure —O—R—O—, in which R represents an alkylene.

The term "alkynyl" refers to straight or branched chain hydrocarbon groups of 2 to 10, preferably 2 to 4, carbon atoms having at least one triple bond. Where an alkynyl group is bonded to a nitrogen atom, it is preferred that such group not be bonded directly through a carbon bearing a triple bond.

The term "alkylene" refers to a divalent straight chain bridge of 1 to 5 carbon atoms connected by single bonds (e.g., —$(CH_2)_x$—, wherein x is 1 to 5), which may be substituted with 1 to 3 lower alkyl groups.

The term "alkenylene" refers to a straight chain bridge of 2 to 5 carbon atoms having one or two double bonds that is connected by single bonds and may be substituted with 1 to 3 lower alkyl groups. Exemplary alkenylene groups are —CH=CH—CH=CH—, —CH₂—CH=CH—, —CH₂—CH=CH—CH₂—, —C(CH₃)₂CH=CH— and —CH(C₂H₅)—CH=CH—.

The term "alkynylene" refers to a straight chain bridge of 2 to 5 carbon to atoms that has a triple bond therein, is connected by single bonds, and may be substituted with 1 to 3 lower alkyl groups. Exemplary alkynylene groups are —C≡C—, —CH₂—C≡C—, —CH(CH₃)C≡C— and —C≡C—CH(C₂H₅)CH₂—.

The terms "cycloalkyl" and "cycloalkenyl" as employed herein includes saturated and partially unsaturated cyclic, respectively, hydrocarbon groups having 3 to 12 carbons, preferably 3 to 8 carbons, and more preferably 3 to 6 carbon.

The terms "Ar" or "aryl" refer to aromatic cyclic groups (for example 6 membered monocyclic, 10 membered bicyclic or 14 membered tricyclic ring systems) which contain 6 to 14 carbon atoms. Exemplary aryl groups include phenyl, naphthyl, biphenyl and anthracene.

"Heteroaryl" refers to a monocyclic or fused ring (i.e., rings which share an adjacent pair of atoms) group of 5 to 12 ring atoms containing one, two, three or four ring heteroatoms selected from N, O, or S, the remaining ring atoms being C, and, in addition, having a completely conjugated pi-electron system, wherein 0, 1, 2, 3, or 4 atoms of each ring may be substituted by a substituent. Examples, without limitation, of heteroaryl groups are pyrrole, furan, thiophene, imidazole, oxazole, thiazole, pyrazole, pyridine, pyrimidine, quinoline, quinazoline, isoquinoline, purine and carbazole.

The terms "heterocycle", "heterocyclic" or "heterocyclo" refer to fully saturated or partially unsaturated cyclic groups, for example, 3 to 7 membered monocyclic, 7 to 12 membered bicyclic, or 10 to 15 membered tricyclic ring systems, which have at least one heteroatom in at least one ring, wherein 0, 1, 2 or 3 atoms of each ring may be substituted by a substituent. Each ring of the heterocyclic group containing a heteroatom may have 1, 2, 3 or 4 heteroatoms selected from nitrogen atoms, oxygen atoms and/or sulfur atoms, where the nitrogen and sulfur heteroatoms may optionally be oxidized and the nitrogen heteroatoms may optionally be quaternized. The heterocyclic group may be attached at any heteroatom or carbon atom of the ring or ring system.

The term "heterocyclyl" refers to fully saturated or partially unsaturated cyclic groups, for example, 3 to 7 membered monocyclic, 7 to 12 membered bicyclic, or 10 to 15 membered tricyclic ring systems, which have at least one heteroatom in at least one ring, wherein 0, 1, 2 or 3 atoms of each ring may be substituted by a substituent. Each ring of the heterocyclyl group containing a heteroatom may have 1, 2, 3 or 4 heteroatoms selected from nitrogen atoms, oxygen atoms and/or sulfur atoms, where the nitrogen and sulfur heteroatoms may optionally be oxidized and the nitrogen heteroatoms may optionally be quaternized. The heterocyclyl group may be attached at any heteroatom or carbon atom of the ring or ring system.

The term "substituents" refers to a group "substituted" on any functional group delineated herein, e.g., alkyl, alkenyl, alkynyl, cycloalkyl, cycloalkenyl, aryl, heterocyclyl, or heteroaryl group at any atom of that group. Suitable substituents include, without limitation halogen, CN, NO₂, OR$^{15}$, SR$^{15}$, S(O)₂OR$^{15}$, NR$^{15}$R$^{16}$, C₁-C₂ perfluoroalkyl, C₁-C₂ perfluoroalkoxy, 1,2-methylenedioxy, C(O)OR$^{15}$, C(O)NR$^{15}$R$^{16}$, OC(O)NR$^{15}$R$^{16}$, NR$^{15}$C(O)NR$^{15}$R$^{16}$, C(NR$^{16}$)NR$^{15}$R$^{16}$, NR$^{15}$C(NR$^{16}$)NR$^{15}$R$^{16}$, S(O)₂NR$^{15}$R$^{16}$, R$^{17}$, C(O)R$^{17}$, NR$^{15}$C(O)R$^{17}$, S(O)R$^{17}$, S(O)₂R$^{17}$, R$^{16}$, oxo, C(O)R$^{16}$, C(O)(CH₂)nOH, (CH₂)nOR$^{15}$, (CH₂)nC(O)NR$^{15}$R$^{16}$, NR$^{15}$S(O)₂R$^{17}$, where n is independently 0-6 inclusive. Each R$^{15}$ is independently hydrogen, C₁-C₄ alkyl or C₃-C₆ cycloalkyl. Each R$^{16}$ is independently hydrogen, alkenyl, alkynyl, C₃-C₆ cycloalkyl, aryl, heterocyclyl, heteroaryl, C₁-C₄ alkyl or C₁-C₄ alkyl substituted with C₃-C₆ cycloalkyl, aryl, heterocyclyl or heteroaryl. Each R$^{17}$ is independently C₃-C₆ cycloalkyl, aryl, heterocyclyl, heteroaryl, C₁-C₄ alkyl or C₁-C₄ alkyl substituted with C₃-C₆ cycloalkyl, aryl, heterocyclyl or heteroaryl. Each C₃-C₆ cycloalkyl, aryl, heterocyclyl, heteroaryl and C₁-C₄ alkyl in each R$^{15}$, R$^{16}$ and R$^{17}$ can optionally be substituted with halogen, CN, C₁-C₄ alkyl, OH, C₁-C₄ alkoxy, NH₂, C₁-C₄ alkylamino, C₁-C₄ dialkylamino, C₁-C₂ perfluoroalkyl, C₁-C₂ perfluoroalkoxy, or 1,2-methylenedioxy.

The term "oxo" refers to an oxygen atom, which forms a carbonyl when attached to carbon, an N-oxide when attached to nitrogen, and a sulfoxide or sulfone when attached to sulfur.

In the present invention, a part represented by '*' in the Chemical Formula refers to a part bonded in the main chain of the poly(arylene ether) copolymer otherwise indicated.

The recitation of a listing of chemical groups in any definition of a variable herein includes definitions of that variable as any single group or combination of listed groups. The recitation of an embodiment for a variable herein includes that embodiment as any single embodiment or in combination with any other embodiments or portions thereof. The recitation of an embodiment herein includes that embodiment as any single embodiment or in combination with any other embodiments or portions thereof.

Polymers

The present inventors have discovered that in the case where a quinoxaline compound is copolymerized with specific dihydroxy monomers and dihalide monomers, and then, the copolymer is substituted by a cation exchange group, a polymer is designed so that the side chain length of the hydrophilic part is long and the cation exchange group is dense, so that the introduction of an amount of the cation exchange groups may be easily controlled by changing equivalent amount of a functionalizing agent. Also discovered by the invention is that a cation exchange membrane prepared using the polymer has excellent physical properties, ion exchange capacity and metal ion adsorption capacity.

Particularly, the copolymer of the present invention has increased hydrogen ion conductivity and decreased methanol permeability by copolymerization of a quinoxaline compound in the main chain.

According to one embodiment of the invention, a poly(arylene ether) copolymer represented by Formula 1 is provided:

[Formula 1]

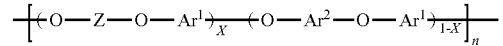

wherein, each X is independently 0.01 to 0.99;

n is an integer of from 10 to 800;

each Z is independently represented by Formula 2-a;

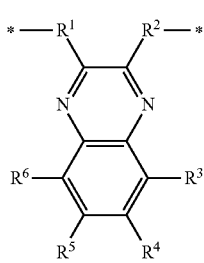

[Formula 2-a]

wherein, each $R^1$ and $R^2$ are independently a chemical bond, an alkylene group or arylene group, each of which is unsubstituted or substituted with a sulfonic acid group (—$SO_3^-M^+$), a phosphoric acid group (—$PO_3^-M^+$) or a carboxyl group (—$COO^-M^+$), wherein $M^+$ is a cation; and each $R^3$ to $R^6$ are independently a hydrogen atom, a $C_{1-3}$ alkyl group, an alkylene group or arylene group, each of which is unsubstituted or substituted with a sulfonic acid group (—$SO_3^-M^+$), a phosphoric acid group (—$PO_3^-M^+$) or a carboxyl group (—$COO^-M^+$), wherein $M^+$ is a cation;

each $Ar^1$ is independently selected from the group consisting of Formula 3-a;

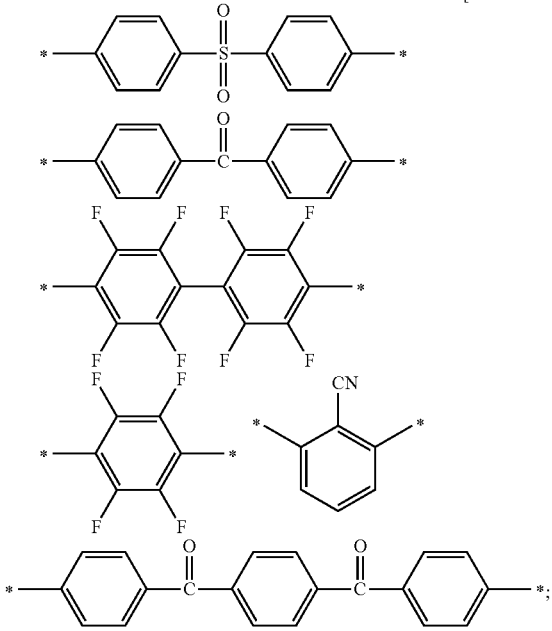

[Formula 3-a]

and each $Ar^2$ independently selected from the group consisting of Formula 4-a;

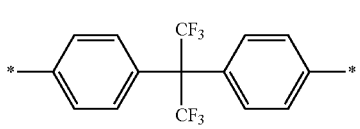

[Formula 4-a]

-continued

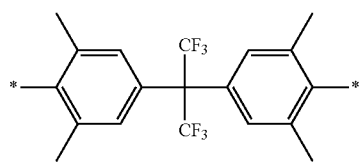

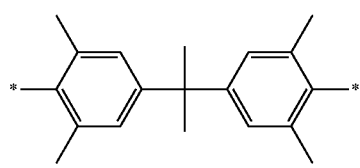

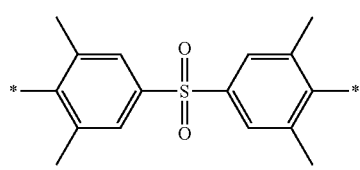

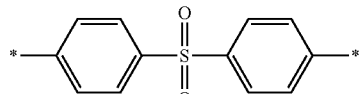

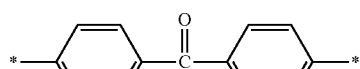

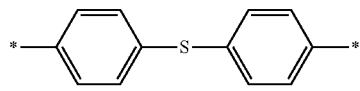

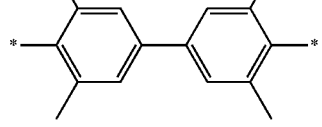

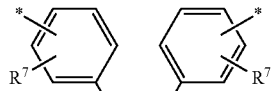

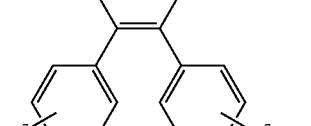

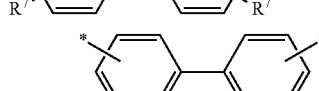

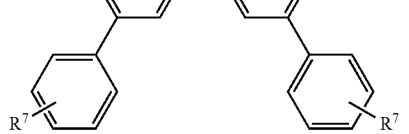

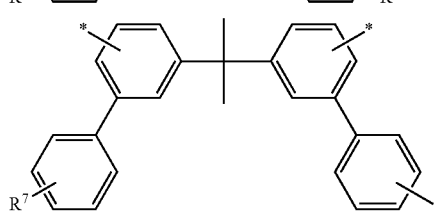

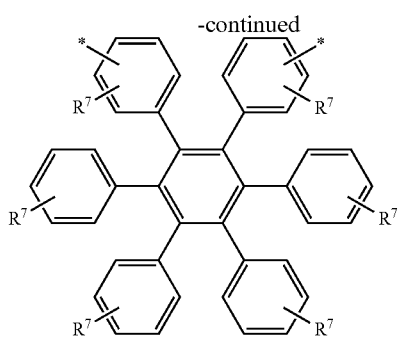

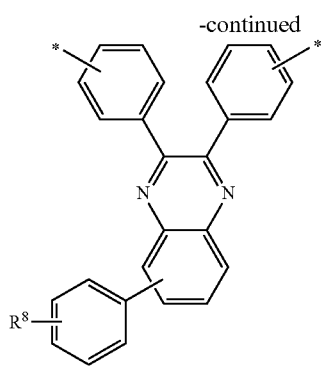

wherein, each $R^7$ is independently a hydrogen atom, a sulfonic acid group (—$SO_3^-M^+$), a phosphoric acid group (—$PO_3^-M^+$) or a carboxylic acid group (—$COO^-M^+$), wherein $M^+$ is a cation;

provided that at least one of $R^1$ to $R^6$ is substituted with a sulfonic acid group (—$SO_3^-M^+$), a phosphoric acid group (—$PO_3^-M^+$) or a carboxylic acid group (—$COO^-M^+$) when $Ar^2$ does not have a sulfonic acid group (—$SO_3^-M^+$), a phosphoric acid group (—$PO_3^-M^+$) or a carboxylic acid group (—$COO^-M^+$)).

In certain embodiments, n is preferably 20 to 800.

In other embodiments, X is 0.1 to 0.9. In a further embodiment, X is 0.2 to 0.8.

In various embodiments, each Z is selected from the group consisting of Formula 2-b:

[Formula 2-b]

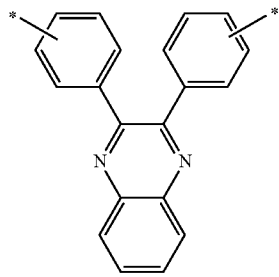

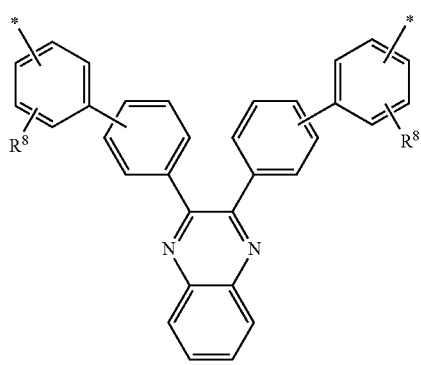

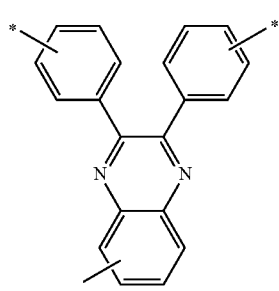

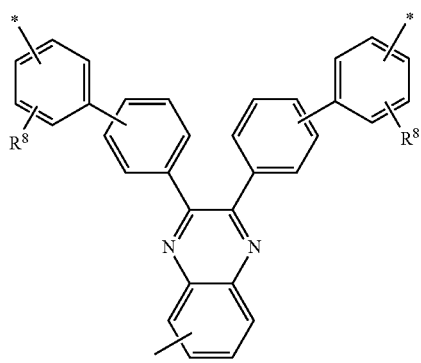

-continued

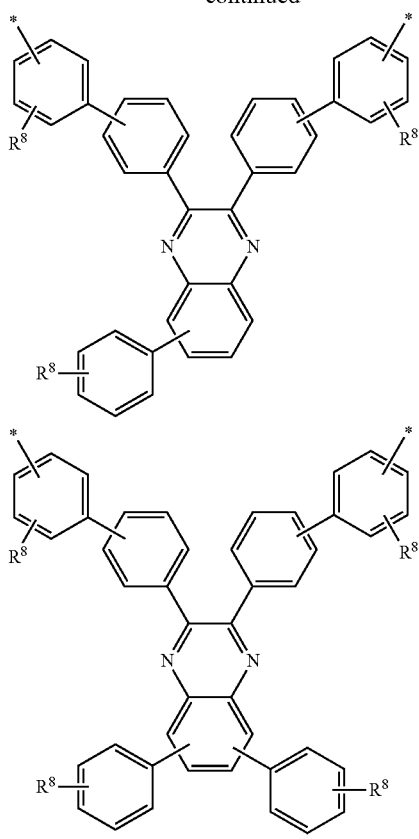

wherein, each $R^8$ is independently a hydrogen atom, a sulfonic acid group ($-SO_3^-M^+$), a phosphoric acid group ($-PO_3^-M^+$) or a carboxylic acid group ($-COO^-M^+$), wherein $M^+$ is a cation.

In general, in the main chain of a copolymer, a hydrophilic part functions for delivering cations, a hydrophobic part functions for maintaining properties of a film, and the performance of a polymer film may be determined according to the design of the structures of the hydrophilic part and the hydrophobic part.

In this respect, as shown in Formula 1, since the poly(arylene ether) copolymer having a cation exchange group is designed so that the side chain length of the hydrophilic part is long and the sulfonic acid group is dense, the dimensional stability to moisture may be ensured by improving the formation of ion channels, exhibiting high cation exchange capacity, and relatively widening the hydrophobic part when the polymer film is formed.

The poly(arylene ether) copolymer of the present invention may be a random copolymer or a block copolymer.

The molecular weight of the poly(arylene ether) copolymer may be easily determined by one of ordinary knowledge in the art, considering mechanical properties and cation exchange capacity and the like. In various embodiments, the weight average molecular weight of the polymer of the invention ranges from about 10,000 to 1,000,000, more preferably 30,000 to 800,000.

According to another embodiment of the present invention, provided is a manufacturing method of the poly(arylene ether) copolymer of Formula 1, which comprises the steps of:

(a) copolymerizing a quinoxaline compound of Formula 2-c, at least one compound selected from Formula 3-b, and at least one compound selected from Formula 4-b; and (b) introducing a cation exchange group selected from a sulfonic acid group ($-SO_3^-M^+$), a phosphoric acid group ($-PO_3^-M^+$) or a carboxylic acid group ($-COO^-M^+$) into the copolymerized polymer:

[Formula 2-c]

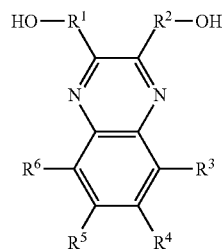

[Formula 3-b]

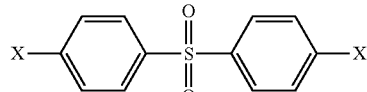

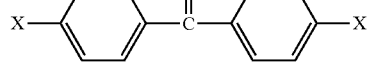

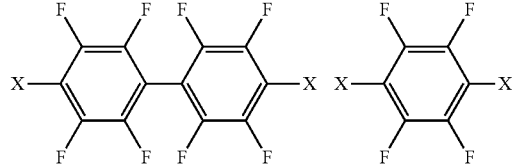

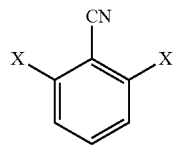

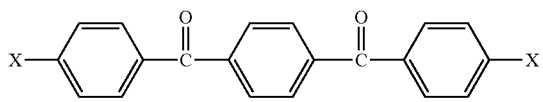

[Formula 4-b]

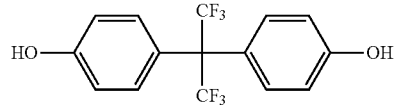

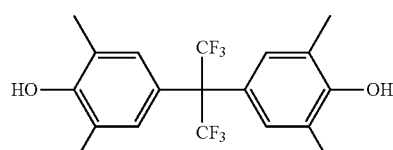

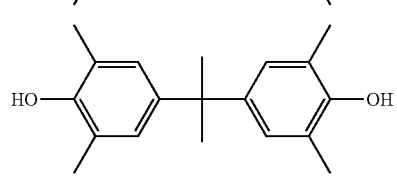

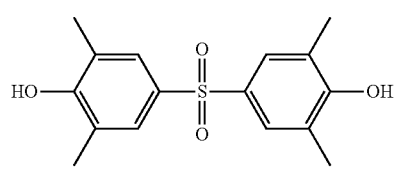

-continued
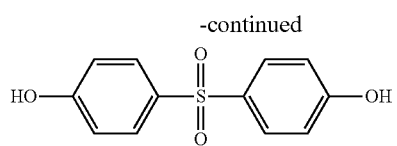
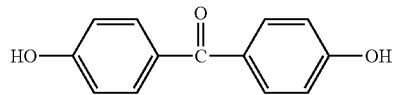
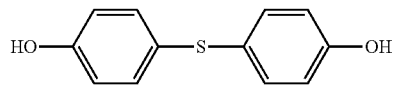
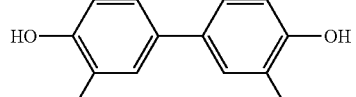
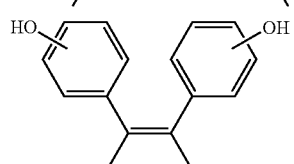
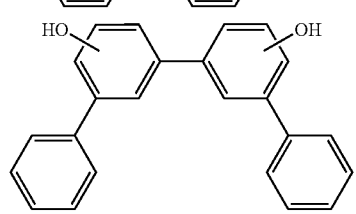
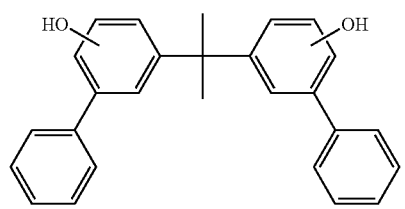
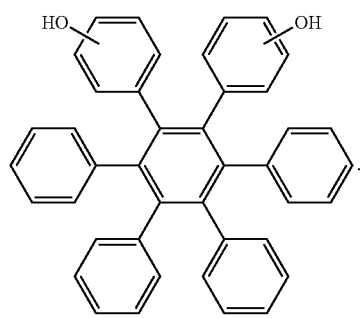
wherein,
each $R^1$ to $R^6$ are as defined previously; and each X is independently a halogen atom.
In certain embodiments, the compound of Formula 2-c is selected from a compound of Formula 2-d:
[Formula 2-d]
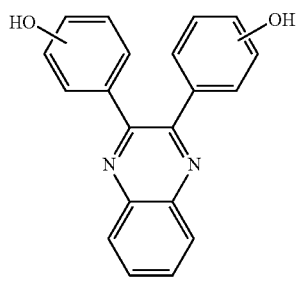
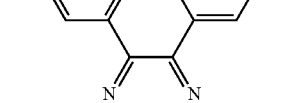
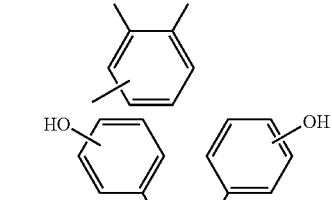
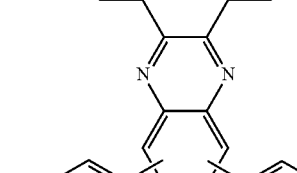
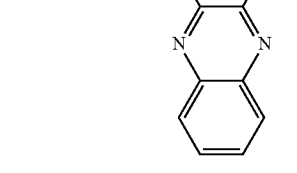

-continued

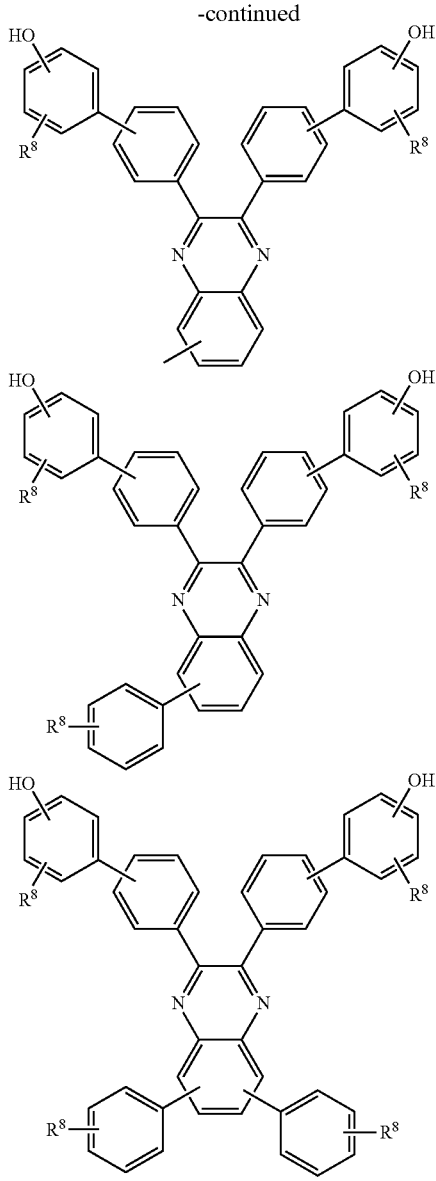

wherein, each $R^8$ is independently a hydrogen atom, a sulfonic acid group (—$SO_3^-M^+$), a phosphoric acid group (—$PO_3^-M^+$) or a carboxylic acid group (—$COO^-M^+$), wherein $M^+$ is a cation.

Hereinafter, steps of the manufacturing method according to an exemplary embodiment of the present invention will be described.

However, the following steps describe only one embodiment of the manufacturing method according to the present invention, and the manufacturing method may further include various other/additional steps that are generally conducted in the art to which the present invention pertains.

a) Copolymerization of Monomers

In this step, monomers are polycondensed to synthesize a copolymer. This step is conducted through a nucleophilic substitution reaction via an to activation step and a polymerization step.

In this step, the X value of Formula 1 may be determined according to the content ratio of each monomer. In a preferred embodiment, the copolymerization of the monomers may be conducted so that an equivalent ratio of at least one compound of Formula 3-b:the compound of Formula 2-c:and at least one compound of Formula 4-b is 1:0.05~0.95:0.05~0.95, more preferably 1:0.2~0.8:0.2~0.8.

According to one embodiment of the present invention, the monomers may be added by controlling the contents of the monomers within a range such that the sum of the mole number of the compound of Formula 2-c and at least one compound of Formula 4-b is the same as the mole number of at least one compound of Formula 3-b.

In particular, the equivalent ratio of at least one compound of Formula 3-b:a compound of Formula 2-c:at least one compound of Formula 4-b may be, but not limited thereto, (1:0.95: 0.05), (1:0.9:0.1), (1:0.85:0.15), (1:0.8:0.2), (1:0.75:0.25), (1:0.7:0.3), (1:0.65:0.35), (1:0.6:0.4), (1:0.55:0.45), (1:0.5: 0.5), (1:0.45:0.55), (1:0.4:0.6), (1:0.35:0.65), (1:0.3:0.7), (1:0.25:0.75), (1:0.2:0.8), (1:0.15:0.85), (1:0.1:0.9), or (1:0.05:0.95).

The copolymerization of the monomers may be conducted in the presence of a solvent selected from the group consisting of dimethylacetamide, N-methylpyrrolidone, dimethylformamide, dimethyl sulfoxide, methylene chloride, chloroform, tetrahydrofuran, benzene, toluene, and xylene, or a combination thereof.

According to an exemplary embodiment of the present invention, this step may be conducted by mixing the monomers in the solvent, performing the activation step at about 100 to 180° C. for about 2 to 4 hours, gradually increasing the temperature to about 120 to 200° C., performing the polymerization reaction for about 12 to 48 hours, washing with the solvent, and drying.

b) Introduction of a Cation Exchange Group into the Copolymerized Polymer

In this step, the cation exchange group is introduced into the poly(arylene ether) copolymer prepared in step (a).

To prepare a copolymer having excellent ion exchange capacity, it is preferable to introduce a cation exchange group in the copolymerized polymer, regardless of the kind of the quinoxaline compound.

The cation exchange group may be a sulfonic acid group (—$SO_3^-M^+$), a phosphoric acid group (—$PO_3^-M^+$) or a carboxyl group (—$COO^-M^+$). The method for introducing the cation exchange group into the copolymer may be conducted according to a general method (which is known to one of skill in the art) for reacting the copolymer with the sulfonic acid compound, the phosphoric acid compound or the carboxylic acid compound.

The sulfonic acid compound is not particularly limited and may include, for example, any general sulfonic acid compound known in the art to which the present invention pertains. Preferably, it may be selected from the group consisting of concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP), or a combination thereof.

The phosphoric acid compound is not particularly limited and may include, for example, any general phosphoric acid compound known in the art to which the present invention pertains. In a preferred embodiment, diethyl hypophosphorous salt, phosphoric acid or a mixture thereof may be used. The carboxylic acid compound is not particularly limited and may include, for example, any general carboxylic acid compound known in the art to which the present invention pertains. In addition to the method for introducing the cation exchange group by using a phosphoric acid compound and a carboxylic acid compound, a copolymer having the cation exchange group may be prepared by copolymerizing the monomers including a phosphoric acid group or carboxylic acid group in the copolymerization step of the above-mentioned monomers.

The introducing of the cation exchange group into the copolymerized polymer may be conducted at a temperature range of from about 0 to 100° C., preferably about 25 to 50° C.

According to an exemplary embodiment of the present invention, this step may be conducted by dissolving the copolymer synthesized in the copolymerization step in a solvent, adding a compound for introducing the cation exchange group, reacting for 1 to 5 hours, and filtering and drying the product.

As described above, since the poly(arylene ether) copolymer according to the present invention has excellent physical characteristics, ion exchange capacity and metal ion adsorption capacity, it is used as a cation exchange resin or membrane.

Therefore, according to another embodiment of the present invention, a cation exchange resin comprising the poly (arylene ether) copolymer of Formula 1 is provided.

Since the poly(arylene ether) copolymer according to the present invention has excellent solubility in various solvents at room temperature, it may be molded in various shapes. For example, it may be manufactured in the form of a gel, porous spherical beads, and granules for application as a cation exchange resin. The molded cation exchange resin of the present invention may be applied to a chromatography column, a composite material, and a filtering member including the cation exchange resin.

Another exemplary embodiment of the present invention provide a cation exchange membrane including the poly (arylene ether) copolymer of Formula 1.

A method for forming the membrane using the poly (arylene ether) copolymer is not particularly limited, and may be conducted by a common method known in the art. Preferably, the membrane may be prepared by dissolving the poly (arylene ether) copolymer in an organic solvent such as dimethylacetamide, dimethylacrylic acid (DMAc), N-methyl-2-pyrrolidone (NMP), or dimethylformamide (DMF); casting the resulting solution on a glass substrate; and drying it to remove the solvent. Since the poly(arylene ether) copolymer of the present invention has excellent processability, it is convenient to form the membrane.

In the manufacturing of the cation exchange membrane, in addition to the poly(arylene ether) copolymer according to the present invention, an additional component commonly used for manufacturing of a cation exchange membranes may be further added.

According to an exemplary embodiment of the present invention, in addition to the poly(arylene ether) copolymer, a proton conductive polymer selected from the group consisting of polyimide, polyetherketone, polysulfone, polyethersulfone, polyetherethersulfone, polybenzimidazole, polyphenylene oxide, polyphenylene sulfide, polystyrene, polytrifluorostyrene sulfonic acid, polystyrene sulfonic acid, polyvinylidenefluoride, polyurethane and branched sulfonated polysulfoneketone copolymer, or a combination thereof may be further included.

In addition to the additional polymer component, the ion exchange membrane may further include inorganic materials selected from the group consisting of silicon oxide ($SiO_2$), titanium oxide ($TiO_2$), inorganic phosphoric acid, sulfonated silicon oxide (sulfonated $SiO_2$), sulfonated zirconium oxide (sulfonated ZrO), and sulfonated zirconium phosphate (sulfonated ZrP), or a combination thereof.

The cation exchange membrane according to the present invention may be applied as a membrane for desalinization, a membrane for concentration, a selectively permeable membrane, and an electrolyte membrane, and used in various fields such as electric dialysis, diffusion dialysis, reverse osmosis, electrolyte dialysis, and fuel cells. In addition, the cation exchange membrane may be used to remove metal ion contaminants in the manufacturing of a positive and negative photoresist.

Hereinafter, in order to help the understanding of the present invention, preferred Examples are described. However, the following Examples are set forth to illustrate the present invention and should not to be construed to limit the present invention.

Example 1

1-a) Preparation of Poly(Arylene Ether) Copolymer (X=0.7)

(Reaction Formula 1-a)

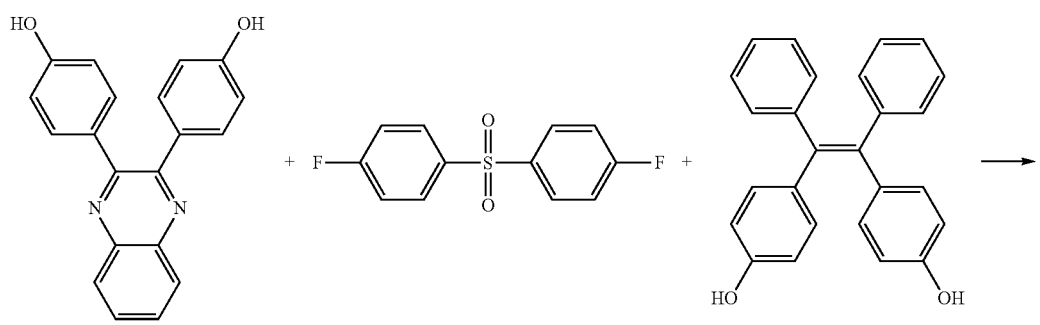

-continued

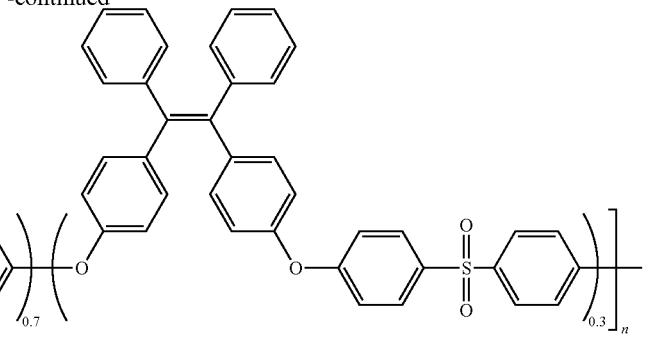
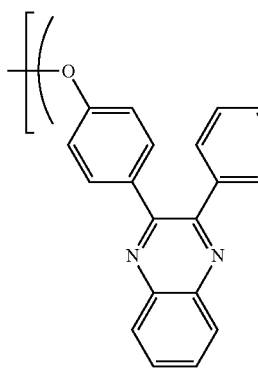

As shown in the Reaction Formula 1-a, under a nitrogen atmosphere, in an equipment provided with a condenser, a Dean-Stark trap, and a magnetic stirrer bar, 4,4'-difluorodiphenylsulfone (20 mmol), 2,3-bis-(4-hydroxyphenyl) quinoxaline (14 mmol) and 1,2-bis-(4-hydroxyphenyl)-1,2-diphenylethylene (6 mmol) were introduced as monomers in a two-neck round bottom flask, and potassium carbonate (24 mmol) was added. At this time, dimethylacetamide (70 ml) and toluene (50 ml) were added as a reaction solvent.

An activation step was performed at a reaction temperature of 140° C. for 4 hours, and water produced as a by-product of the reaction was removed by the reaction solvent of toluene.

Temperature was gradually raised to 165° C. and polymerization reaction was performed for 24 hours. After the reaction was completed, the resultant material was washed several times with methanol/water (volume ratio=1:1), and vacuum dried at 60° C. for 24 hours.

The final product was obtained as a white solid, $^1$H-NMR was performed to analyze the structure, and the results are shown in FIG. 1 ('Example 1-(a)').

1-b) Preparation of Poly(Arylene Ether) Copolymer Having Sulfonic Acid Group (Reaction Formula 1-b)

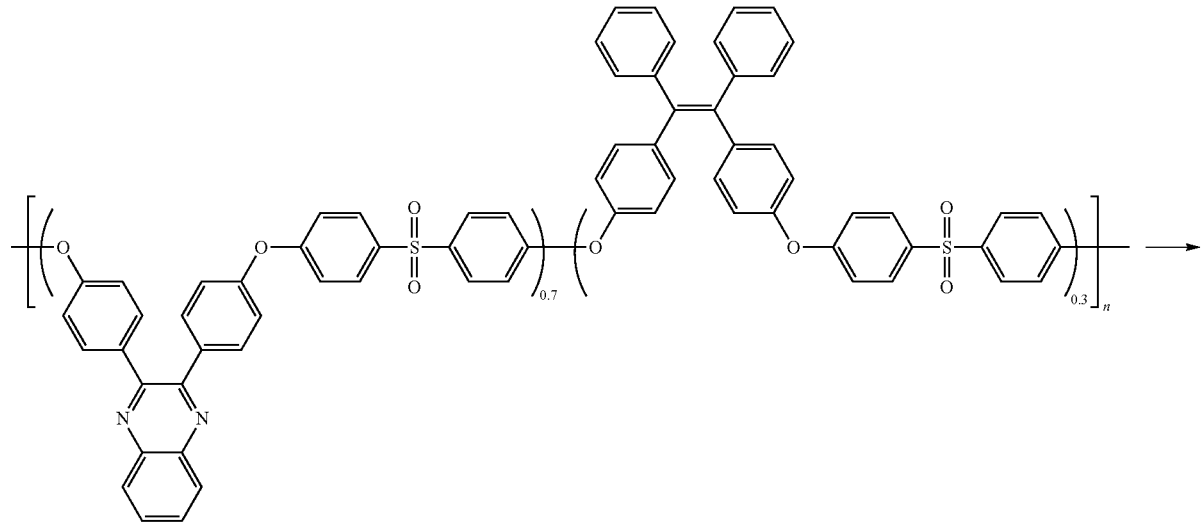

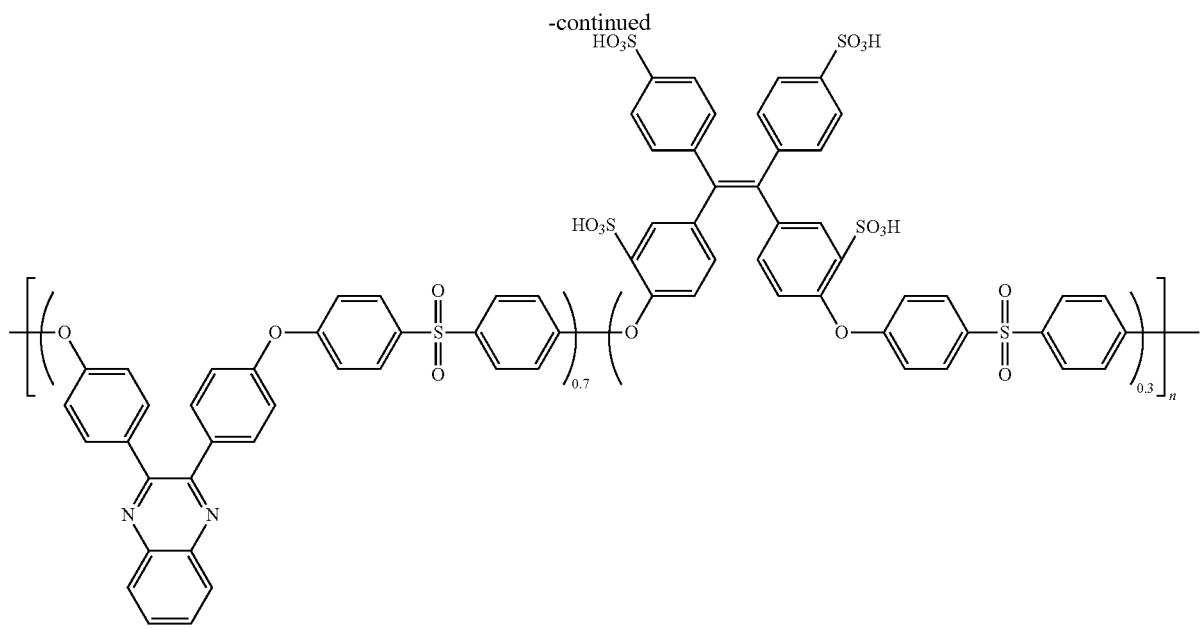

Under a nitrogen atmosphere, in equipment with a condenser, a dropping funnel and a magnetic stirrer bar, 20 g of the copolymer synthesized in step (1-a) was dissolved in 200 mL of concentrated sulfuric acid in a two-neck round bottom flask, and agitated at room temperature for 12 hours. After the reaction was completed, water was removed by precipitation, and the remaining sulfuric acid was washed several times and vacuum-dried. The dried copolymer was dissolved in a dimethylacetamide solution, and vacuum-dried to synthesize a target poly(arylene ether) copolymer having sulfonic acid group (weight average molecular weight: 216,000).

The final product was subjected to $^1$H-NMR to analyze the structure, and the results thereof are shown in FIG. 1 ('Example 1-(b)'). As shown in FIG. 1, a peak change was shown at around 7.50 ppm with the introduction of the sulfonic acid group in the copolymer, indicating that hydrogen at the alpha to position of the sulfonic acid group became the downfield, and it was confirmed through the area ratio that the synthesis was accomplished.

Example 2

2-a) Preparation of Poly(Arylene Ether) Copolymer (X=0.55)

(Reaction Formula 2-a)

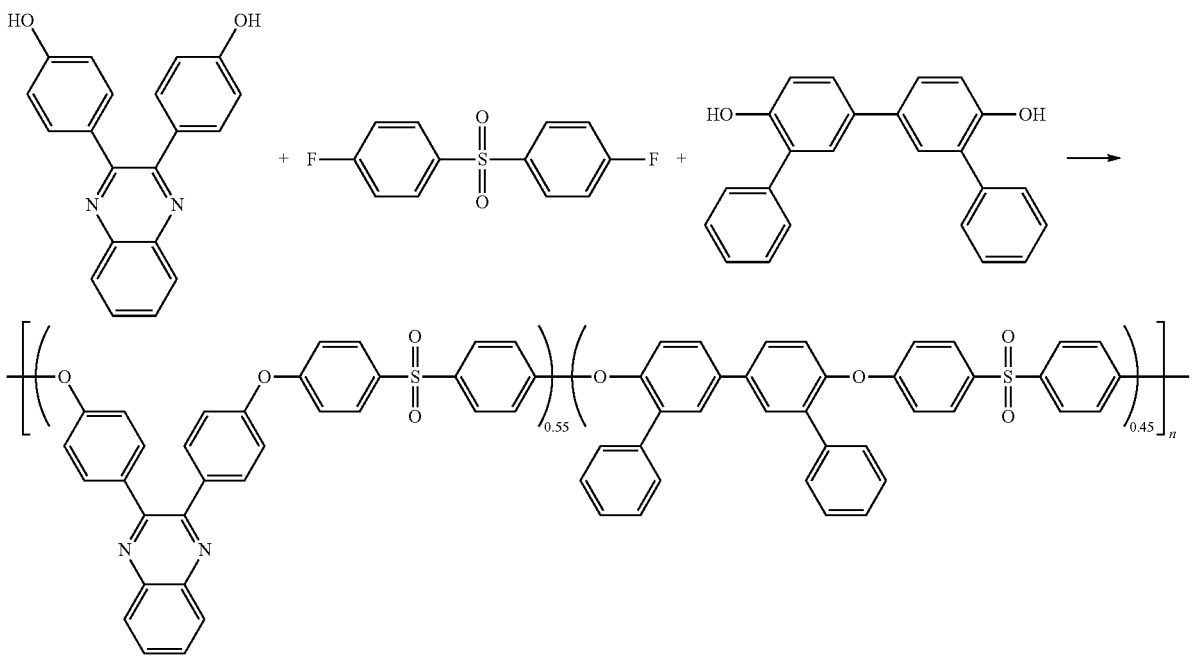

A copolymer was prepared using the same method and conditions as step (1-a) of Example 1, except that the kinds and added amounts of the compounds were changed to 4,4'-difluorodiphenylsulfone (20 mmol), 2,3-bis-(4-hydroxyphenyl)quinoxaline (11 mmol), and 2,2'-diphenyl-p,p'-biphenyl (9 mmol).

Figure 2:
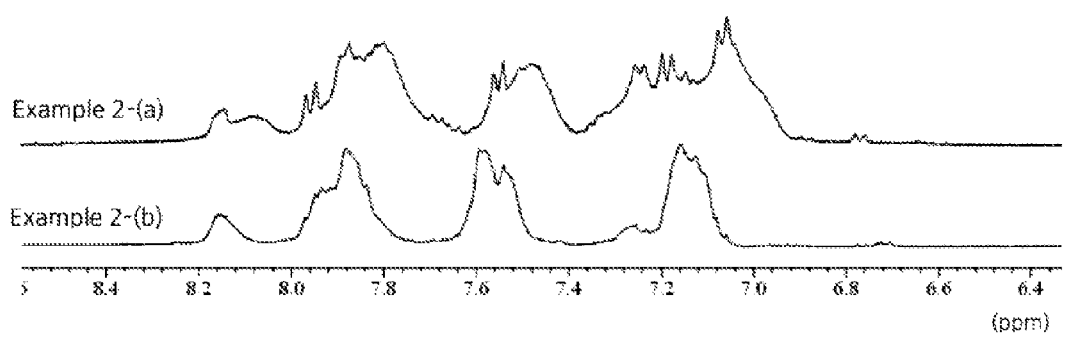
FIG. 2 is a graph showing nuclear magnetic resonance (NMR) spectrums of the poly(arylene ether) copolymer and poly(arylene ether) copolymer having cation exchange group according to another embodiment of the invention.

The final product was obtained as a white solid, $^1$H-NMR was performed to analyze the structure, and the results are shown in FIG. 2 (Example 2-(a)').

2-b) Preparation of Poly(Arylene Ether) Copolymer Having Sulfonic Acid Group (Reaction Formula 2-b)

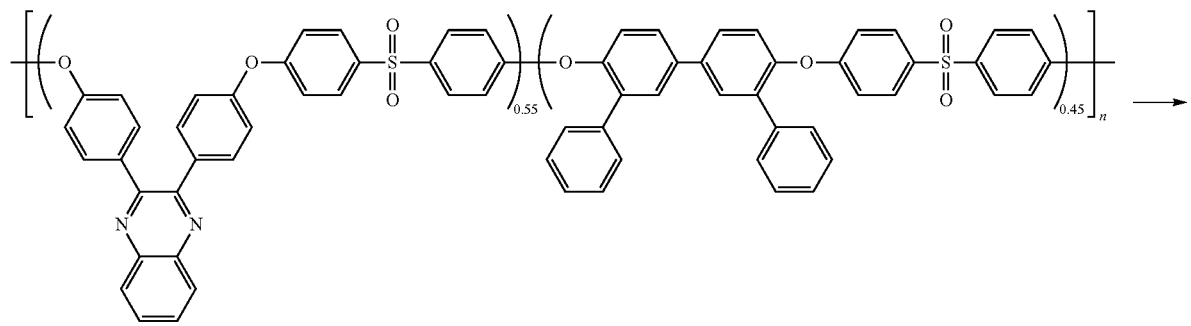

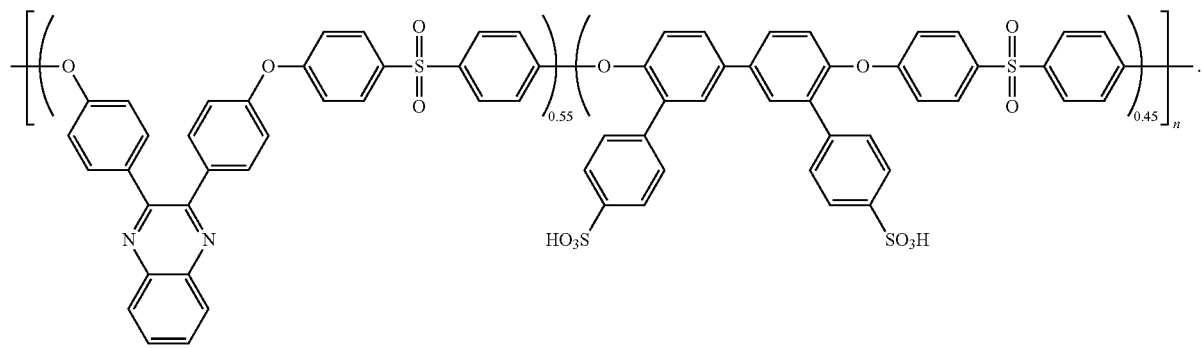

A copolymer having sulfonic acid group was prepared using the same method and conditions as step (1-b) of Example 1, except that the copolymer synthesized in the step (2-a) was used (weight average molecular weight 287,000).

The final product was subjected to $^1$H-NMR to analyze the structure, and the results are shown in FIG. 2 ('Example 2-(b)'). As shown in FIG. 2, the peak change was shown at around 7.50 ppm with the introduction of the sulfonic acid group in the copolymer, indicating that hydrogen at the alpha position of the sulfonic acid group became the downfield, and it was confirmed through the area ratio that the synthesis was accomplished.

Example 3

3-a) Preparation of Poly(Arylene Ether) Copolymer (X=0.6)

(Reaction Formula 3-a)

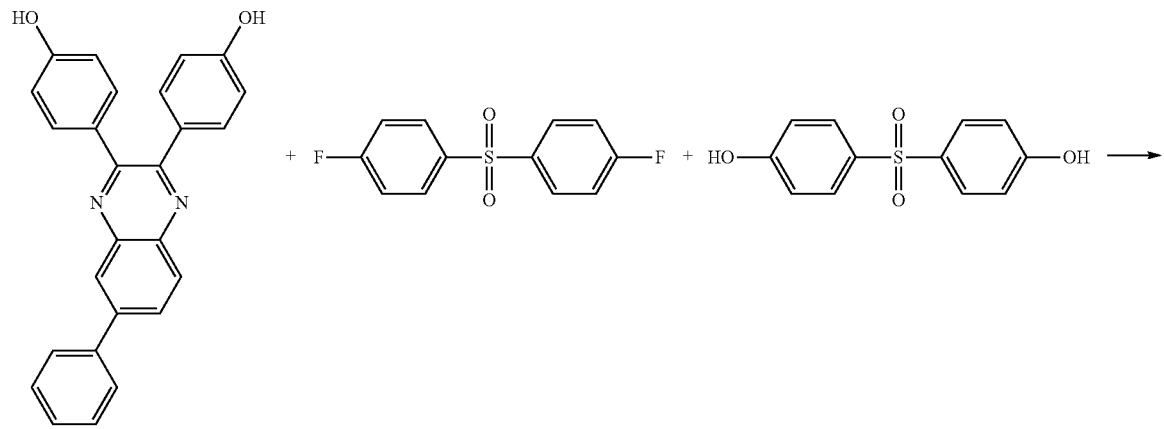

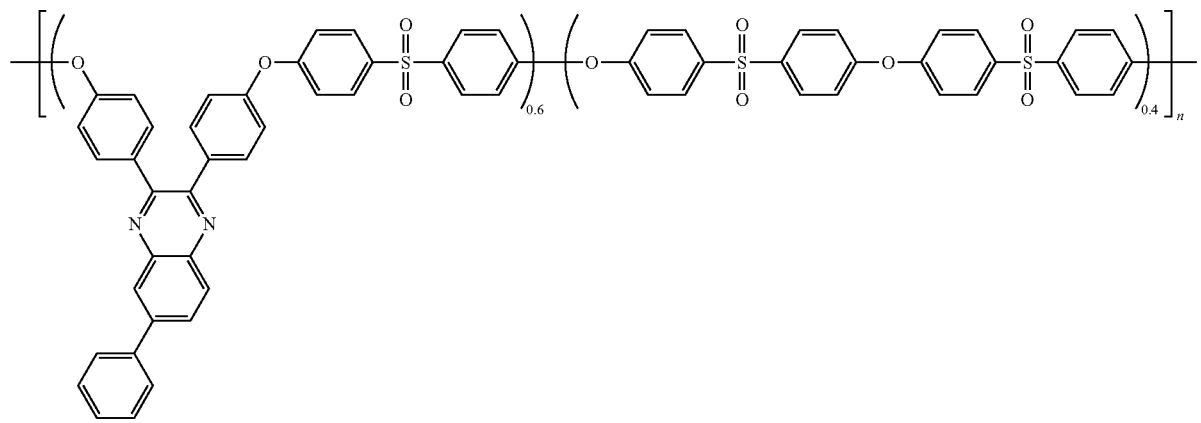

A copolymer was prepared using the same method and conditions as step (1-a) of Example 1, except that the kinds and added amounts of the monomers were changed to 4,4'-difluorodiphenylsulfone (20 mmol), 2,3-bis-(4-hydroxphenyl)phenylquinoxaline (12 mmol) and 4,4'-dihydroxydiphenylsulfone (8 mmol).

The final product was obtained as a white solid, $^1$H-NMR was performed to analyze the structure, and it was confirmed that the synthesis of the copolymer was accomplished.

3-b) Preparation of Poly(Arylene Ether) Copolymer Having Sulfonic Acid Group

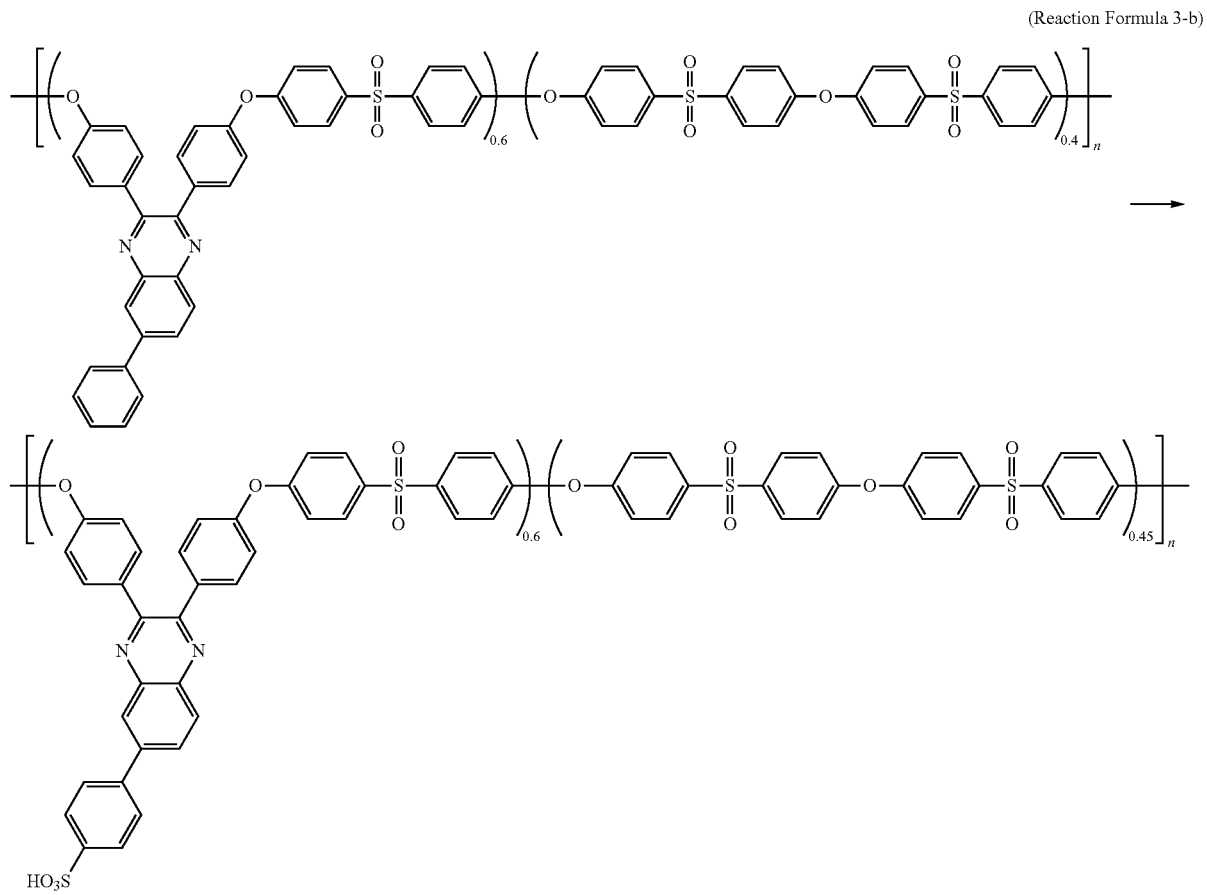

(Reaction Formula 3-b)

A copolymer was prepared using the same conditions and method as step (1-b) of Example 1, except that the copolymer synthesized in the step (3-a) was used (weight average molecular weight: 197,000).

The final product was subjected to $^1$H-NMR to analyze the structure, and the peak change was shown at around 7.50 ppm with the introduction of the sulfonic acid group in the copolymer, indicating that hydrogen at the alpha position of the sulfonic acid group became the downfield, and it was confirmed through the area ratio that the synthesis was accomplished.

Preparation Example 1

Manufacture of Cation Exchange Membrane

The poly(arylene ether) copolymer prepared in step (1-b) of Example 1 was dissolved in dimethylacetamide, cast on a glass plate, and dried at 120° C. to manufacture a polymer electrolyte membrane.

Preparation Example 2

Manufacture of Cation Exchange Membrane

A polymer electrolyte membrane was manufactured by the same method as Preparation Example 1, except that the poly(arylene ether) copolymer prepared in step (2-b) of Example 2 was used.

Comparative Example

A commercially available cation exchange membrane (Manufacturing Company: DuPont, Product name: Nafion-211) was used.

Experimental Example

1. Measurement of Molecular Weight and Dispersibility of the Copolymer

The weight average molecular weight (Mw) and dispersibility (PDI=Mw/Mn) of the sulfonated poly(arylene ether) copolymers manufactured in Examples 1 to 3 were measured using chromatography, and the results are described in the following Table 1. The equipment and condition used in the measurement are described below.

GPC device: Waters Co., Ltd., model name 2414
Used column: Waters Co., Ltd., model name HR 3,4,5 column
Temperature: 80° C./elution solvent: dimethylformamide/elution speed: 1 ml/min
Standard material: polymethylmethacrylate (PMMA)

2. Sulfonation Degree of the Copolymer

The sulfonation degrees (%) of the sulfonated poly(arylene ether) copolymers manufactured in Examples 1 and 2 were measured using NMR, and the results are described in the following Table 1.

3. Measurement of Hydrogen Ion Conductivity

The hydrogen ion conductivities of the cation exchange membranes according to Preparation Examples 1 to 3 and the Comparative Example were measured using impedance spectroscopy (manufactured by Solartron, Co., Ltd.), and the results are described in the following Table 1.

The impedance was measured at a frequency range of 1 Hz to 1 MHz, and the measurement was performed in an in-plane manner, and all tests were performed while the samples were completely wet.

4. Measurement of Methanol Permeability

After each of the cation exchange membranes according to Preparation Examples 1 to 3 and the Comparative Example was disposed between two cells, 15 mL of an 1M methanol aqueous solution was injected into one cell, 15 mL of distilled water was injected into the other cell, 10 µl of samples were collected every 10 min from the cell into which the distilled water was injected, and 10 µl of distilled water was provided again thereto. The methanol concentration of the collected sample was measured by gas chromatography.

The change in methanol concentration over time was recorded as a graph, the methanol permeability was calculated from the slope thereof by the following Equation 1, and the results are described in the following Table 1.

[Equation]

Permeability[cm$^2$/sec]=(Slope[ppm/s]×Solution volume×Electrolyte membrane thickness)/(Electrolyte membrane area×Methanol concentration)

TABLE 1

| classification | Sulfonation degree (%) | Weight average molecular weight (×10$^3$) | dispersibility | Hydrogen ion conductivity (×10$^{-3}$ S/cm) | Methanol permeability (×10$^{-6}$ cm$^2$/sec) |
|---|---|---|---|---|---|
| Preparation Example 1 | 30 | 216 | 2.07 | 5.7 | 0.74 |
| Preparation Example 2 | 45 | 287 | 1.98 | 5.0 | 1.02 |
| Preparation Example 3 | 60 | 197 | 1.87 | 3.9 | 0.51 |
| Comparative Example | — | — | — | 3.5 | 2.10 |

As can be seen from the results of Table 1, since the cation exchange membranes according to Preparation Examples 1 to 3 of the present invention are manufactured using the poly(arylene ether) copolymer having sulfonic acid group of Examples 1 to 3, the weight average molecular weight is high and simultaneously the sulfonation degree is high. Thus, the cation exchange membranes of the present invention exhibit the same or higher hydrogen conductivity compared to the cation exchange membrane of Comparative Example, and yet exhibit low methanol permeability. Thus, it is confirmed that the cation exchange membranes of the present invention have excellent performance as a polymer electrolyte membrane for a fuel cell.

INCORPORATION BY REFERENCE

The contents of all references (including literature references, issued patents, published patent applications, and co-pending patent applications) cited throughout this application are hereby expressly incorporated herein in their entireties by reference.

EQUIVALENTS

Those skilled in the art will recognize, or be able to ascertain using no more than routine experimentation, many equivalents of the specific embodiments of the invention described herein. Such equivalents are intended with be encompassed by the following claims.

What is claimed is:

1. A poly(arylene ether) copolymer represented by Formula 1:

[Formula 1]

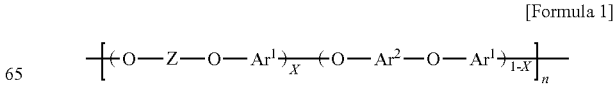

wherein,
each X is independently 0.01 to 0.99;
n is an integer of from 10 to 800;
each Z is independently represented by Formula 2-a;

[Formula 2-a]
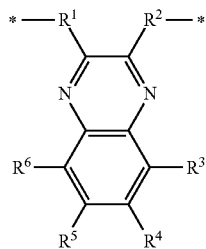

wherein,
each $R^1$ and $R^2$ is independently an alkylene group, or an arylene group, each of which is unsubstituted or substituted with a sulfonic acid group ($-SO_3^-M^+$), a phosphoric acid group ($-PO_3^-M^+$) or a carboxyl group ($-COO^-M^+$), wherein each $M^+$ is independently a cation; and
each $R^3$ to $R^6$ are independently a hydrogen atom, a $C_{1-3}$ alkyl group, an alkylene group, or an arylene group; each of which is unsubstituted or substituted with a sulfonic acid group ($-SO_3^-M^+$), a phosphoric acid group ($-PO_3^-M^+$) or a carboxyl group ($-COO^-M^+$), wherein each $M^+$ is independently a cation;
each $Ar^1$ is independently selected from the group consisting of Formula 3-a;

[Formula 3-a]
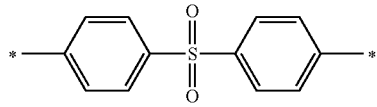

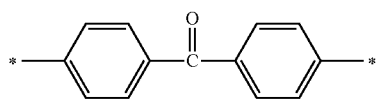

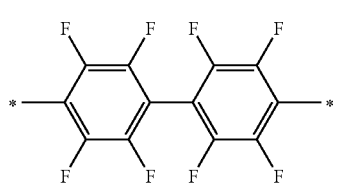

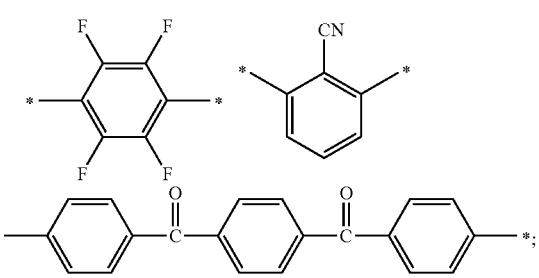

and
each $Ar^2$ is selected from the group consisting of Formula 4-a;

[Formula 4-a]
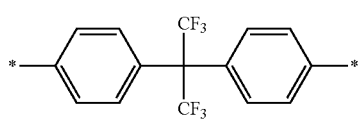

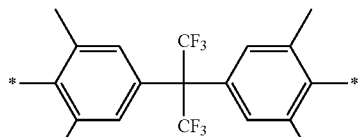

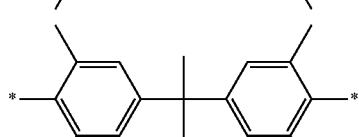

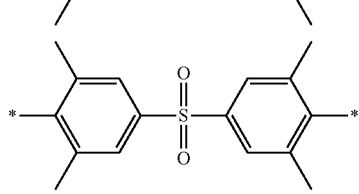

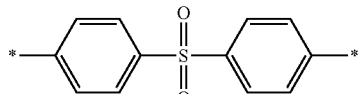

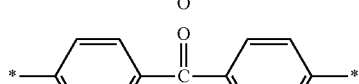

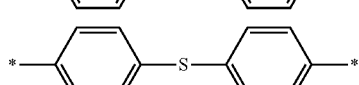

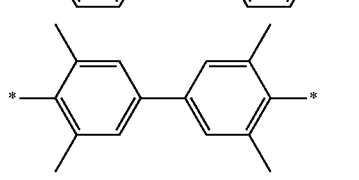

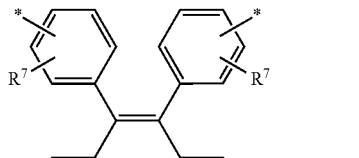

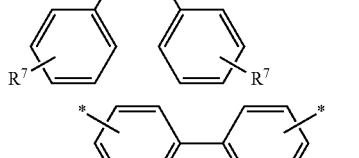

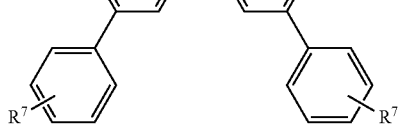

-continued

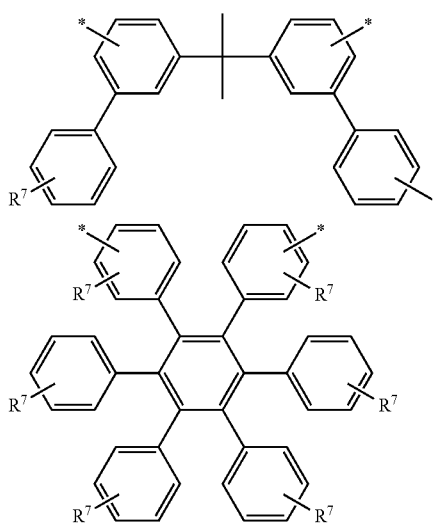

wherein, each $R^7$ is independently a hydrogen atom, a sulfonic acid group ($-SO_3^-M^+$), a phosphoric acid group ($-PO_3^-M^+$) or a carboxylic acid group ($-COO^-M^+$), wherein each $M^+$ is independently a cation;

provided that at least one of $R^1$ to $R^6$ is substituted with a sulfonic acid group ($-SO_3^-M^+$), a phosphoric acid group ($-PO_3^-M^+$) or a carboxylic acid group ($-PO_3^-M^+$) when $Ar^2$ does not have a sulfonic acid group ($-SO_3^-M^+$), a phosphoric acid group ($-PO_3^-M^+$) or a carboxylic acid group ($-COO^-M^+$), wherein one or more of Z is selected from the group consisting of Formula 2-b:

[Formula 2-b]

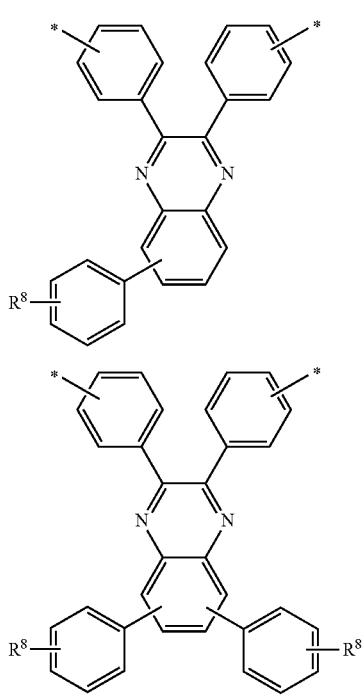

-continued

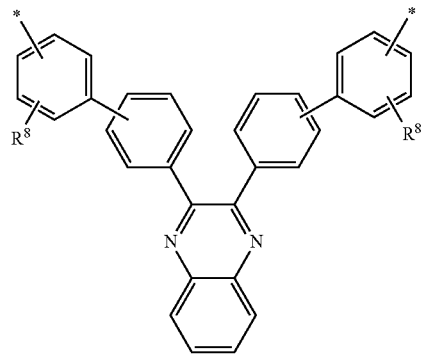

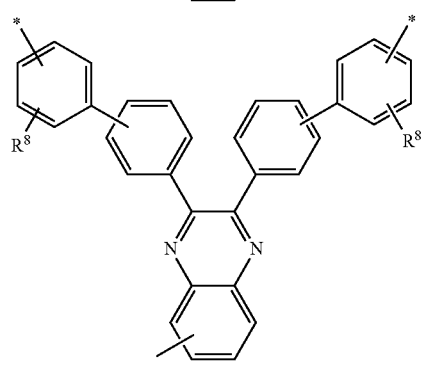

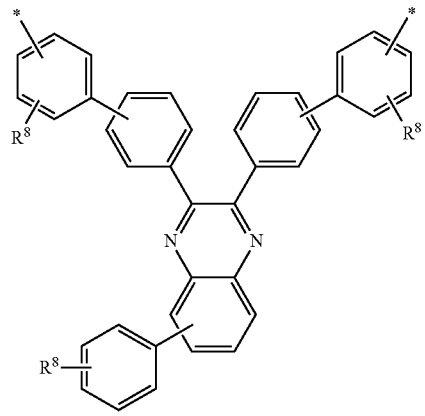

wherein, each $R^8$ is independently a hydrogen atom, a sulfonic acid group ($-SO_3^-M^+$), a phosphoric acid group ($-PO_3^-M^+$) or a carboxylic acid group ($-COO^-M^+$), wherein each $M^+$ is independently a cation.

2. The poly(arylene ether) copolymer of claim 1, wherein each cation (M⁺) of the sulfonic acid group (—SO₃⁻M⁺), phosphoric acid group (—PO₃⁻M⁺) or carboxylic acid group (—COO⁻M⁺) is independently selected from the group consisting of a hydrogen ion, a potassium ion, a sodium ion, and a lithium ion.

3. The poly(arylene ether) copolymer of claim 1, wherein the copolymer is a random copolymer or a block copolymer.

4. The poly(arylene ether) copolymer of claim 1, wherein X is 0.1 to 0.9.

5. The poly(arylene ether) copolymer of claim 1, wherein X is 0.2 to 0.8.

6. The poly(arylene ether) copolymer of claim 1, wherein the copolymer has a weight average molecular weight of 10,000 to 1,000,000.

7. The poly(arylene ether) copolymer of claim 1, wherein the copolymer has a weight average molecular weight of 30,000 to 800,000.

8. A method for manufacturing the poly(arylene ether) copolymer of claim 1, comprising:

(a) copolymerizing a quinoxaline compound represented by Formula 2-d, with at least one compound of Formula 3-b, and at least one compound of Formula 4-b; and (b) introducing a cation exchange group selected from a sulfonic acid group (—SO₃⁻M⁺), a phosphoric acid group (—PO₃⁻M⁺) and a carboxylic acid group (—COO⁻M⁺), into the copolymerized polymer of step (a):

[Formula 2-d]

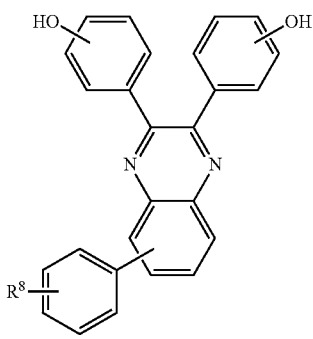

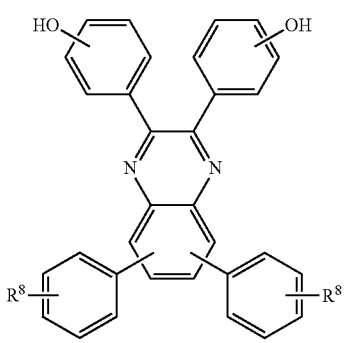

-continued

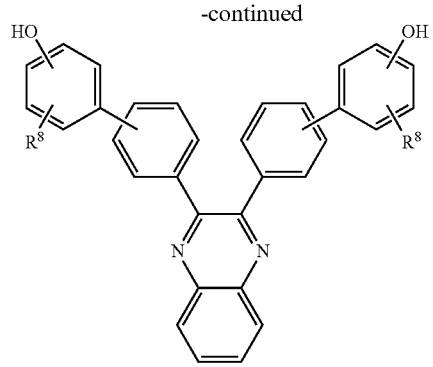

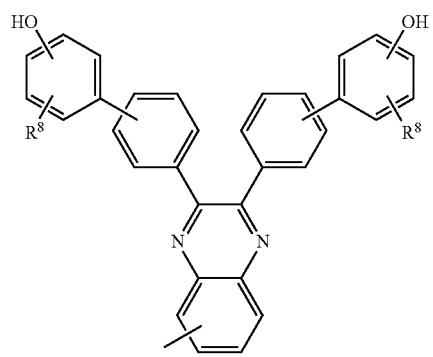

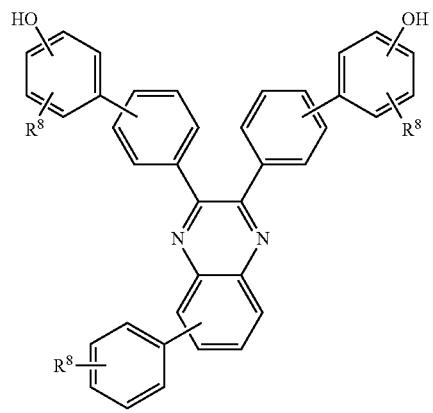

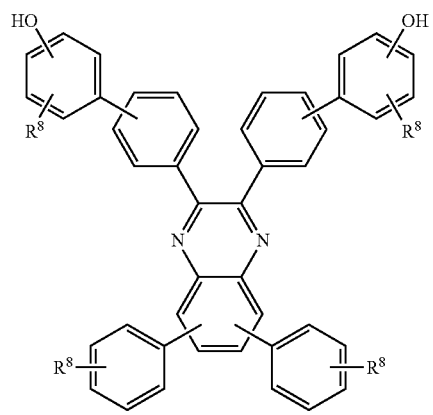

wherein, each $R^8$ is independently a hydrogen atom, a sulfonic acid group (—$SO_3^-M^+$), a phosphoric acid group (—$PO_3^-M^+$) or a carboxylic acid group (—$COO^-M^+$), wherein $M^+$ is a cation;

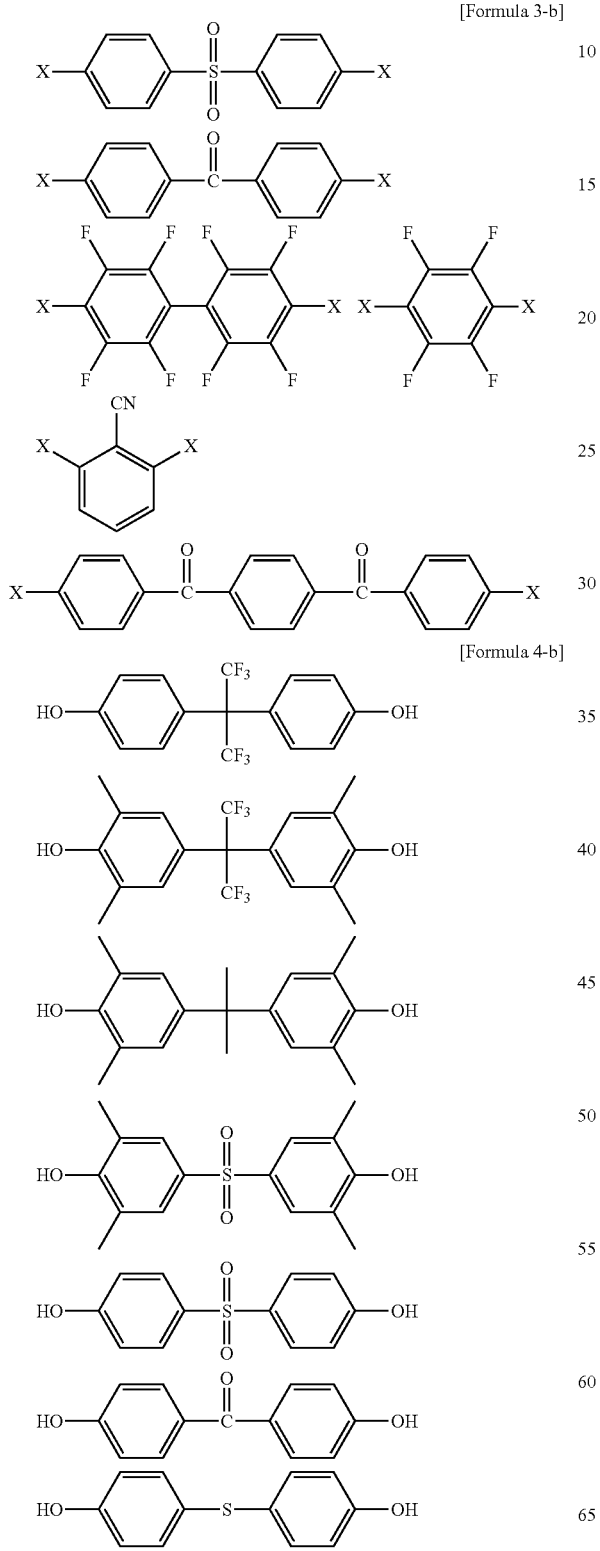

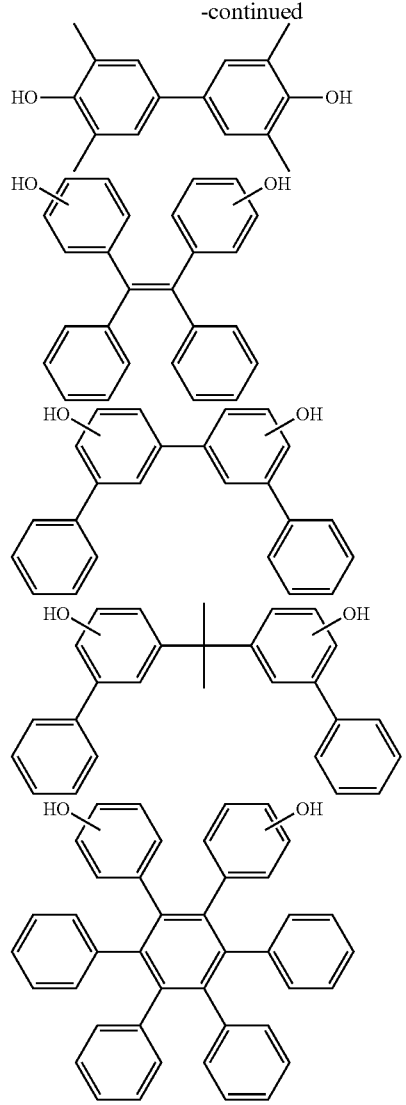

wherein, each $R^1$ to $R^6$ are as defined in the Formula 1 in claim 1; and each X is independently a halogen atom.

9. The method of claim 8, wherein in step (a), a ratio of compounds of Formula 3-b to Formula 2-d to Formula 4-b, is 1:0.05~0.95:0.05~0.95.

10. The method of claim 8, wherein in step (a), a ratio of compounds of Formula 3-b to Formula 2-d to Formula 4-b, is 1:0.2~0.8:0.2~0.8.

11. The method of claim 8, wherein in step (a), the copolymerizing of the compounds is conducted in the presence of a solvent selected from dimethylacetamide, N-methylpyrrolidone, dimethylformamide, dimethyl sulfoxide, methylene chloride, chloroform, tetrahydrofuran, benzene, toluene, and xylene, or a combination thereof.

12. The method of claim 8, wherein in step (b), the introducing of the cation exchange group into the copolymerized polymer is conducted using a sulfonic acid compound selected from concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP), or a combination thereof.

13. The method of claim 8, wherein in step (b), the introducing of the cation exchange group into the copolymerized polymer is conducted at a temperature ranging from about 0 to about 100° C.

14. A cation exchange resin comprising the poly(arylene ether) copolymer of claim 5.

15. A cation exchange membrane comprising the poly (arylene ether) copolymer of claim 1.

16. The cation exchange membrane of claim 15, wherein the cation exchange membrane further comprises a polymer selected from polyimide, polyetherketone, polysulfone, polyethersulfone, polyetherethersulfone, polybenzimidazole, polyphenylene oxide, polyphenylenesulfide, polystyrene, polytrifluorostyrene sulfonic acid, polystyrene sulfonic acid, polyvinylidenefluoride, polyurethane, and branched sulfonated polysulfoneketone copolymer, or a combination thereof.

17. The cation exchange membrane of claim 15, wherein the cation exchange membrane further comprises an inorganic material selected from silicon oxide ($SiO_2$), titanium oxide ($TiO_2$), inorganic phosphoric acid, sulfonated silicon oxide (sulfonated $SiO_2$), sulfonated zirconium oxide (sulfonated ZrO), and sulfonated zirconium phosphate (sulfonated ZrP), or a combination thereof.

* * * * *